(12) United States Patent
Kauser et al.

(10) Patent No.: US 7,995,529 B2
(45) Date of Patent: Aug. 9, 2011

(54) SYSTEM AND METHOD FOR CELL PLANNING IN A WIRELESS COMMUNICATION NETWORK

(75) Inventors: Nicolas Kauser, Kirkland, WA (US); John Saw, Sammamish, WA (US); Peter Gelbman, Kirkland, WA (US)

(73) Assignee: Clear Wireless LLC, Kirkland, WA (US)

( * ) Notice: Subject to any disclaimer, the term of this patent is extended or adjusted under 35 U.S.C. 154(b) by 492 days.

(21) Appl. No.: 12/185,758

(22) Filed: Aug. 4, 2008

(65) Prior Publication Data

US 2008/0318585 A1   Dec. 25, 2008

Related U.S. Application Data

(63) Continuation-in-part of application No. 12/055,169, filed on Mar. 25, 2008.

(60) Provisional application No. 60/908,270, filed on Mar. 27, 2007.

(51) Int. Cl.
*H04W 4/00* (2009.01)
*H04B 7/216* (2006.01)

(52) U.S. Cl. ............... 370/329; 370/328; 370/335

(58) Field of Classification Search ............ 370/329
See application file for complete search history.

(56) References Cited

U.S. PATENT DOCUMENTS

| | | | |
|---|---|---|---|
| 5,537,682 A | 7/1996 | Miller | |
| 6,870,808 B1 | 3/2005 | Liu et al. | |
| 7,548,752 B2 * | 6/2009 | Sampath et al. | 455/447 |
| 7,720,485 B2 * | 5/2010 | Jin et al. | 455/450 |
| 2003/0227889 A1 | 12/2003 | Wu | |
| 2005/0135316 A1 | 6/2005 | Cromer et al. | |
| 2005/0271088 A1 | 12/2005 | Shoemake et al. | |
| 2006/0171354 A1 | 8/2006 | Tee et al. | |
| 2007/0002743 A1 | 1/2007 | Fan | |
| 2007/0015469 A1 | 1/2007 | Cho et al. | |
| 2007/0298807 A1 | 12/2007 | Yarkosky | |
| 2008/0165743 A1 * | 7/2008 | Palanki et al. | 370/335 |
| 2008/0212527 A1 | 9/2008 | Hosein et al. | |

FOREIGN PATENT DOCUMENTS

| | | |
|---|---|---|
| WO | 2005050873 A1 | 6/2005 |
| WO | 2007021139 A1 | 2/2007 |

OTHER PUBLICATIONS

U.S. Appl. No. 12/055,169 filed Mar. 25, 2008: Office Action mailed Mar. 4, 2011.

* cited by examiner

*Primary Examiner* — Jeffrey Pwu
*Assistant Examiner* — Shaq Taha
(74) *Attorney, Agent, or Firm* — Michael J. Donohue; Davis Wright Tremaine, LLP

(57) ABSTRACT

A cellular network having a plurality of mobile stations and a plurality of cells. Each cell is configured to provide communication services to the plurality of mobile stations using at least two overlapping channels. Each cell includes a base station configured to provide communication services using at least four channels, which include the overlapping channels, within a service area divided into three or four sectors. The service area may be hexagonal or square shaped. A first pair of the four channels has an overlapping portion. A second pair of the four channels, the channels of the second pair being different channels than those of the first pair, may also have an overlapping portion. The four channels may each comprise a portion of an Educational Broadband Service/Broadcast Radio Services band. The first and second pairs of channels may be nonadjacent to one another.

31 Claims, 15 Drawing Sheets

| SYSTEM PROFILES | CERTIFICATION PROFILES | | |
|---|---|---|---|
| | Spectrum | Duplexing | Channel Width |
| Mobile WiMAX (IEEE 802.16e-2005, OFDMA) | 2.3-2.4 GHz | TDD | 5, 10 MHz (dual) |
| | 2.3-2.4 GHz | TDD | 8.75 MHz |
| | 3.4-3.6 GHz | TDD | 5 MHz |
| | 3.4-3.6 GHz | TDD | 7 MHz |
| | 2.496-2.690 GHz | TDD | 5, 10 MHz (dual) |

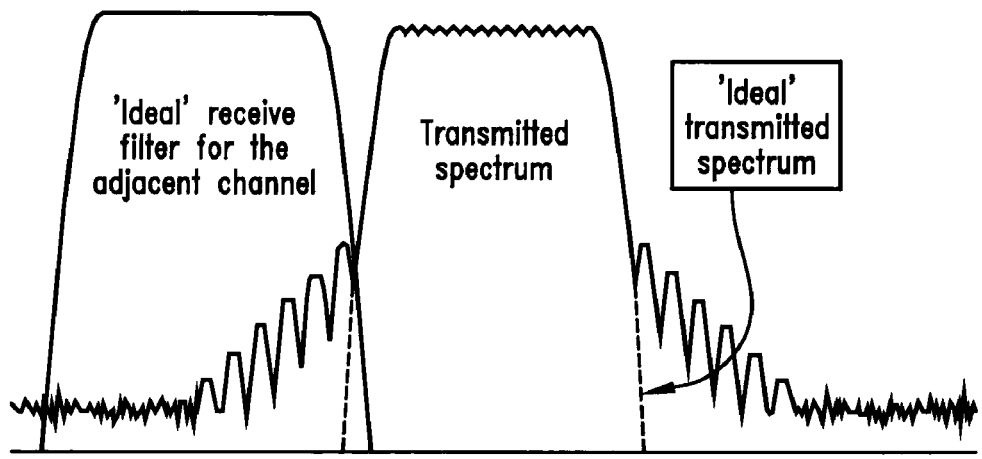
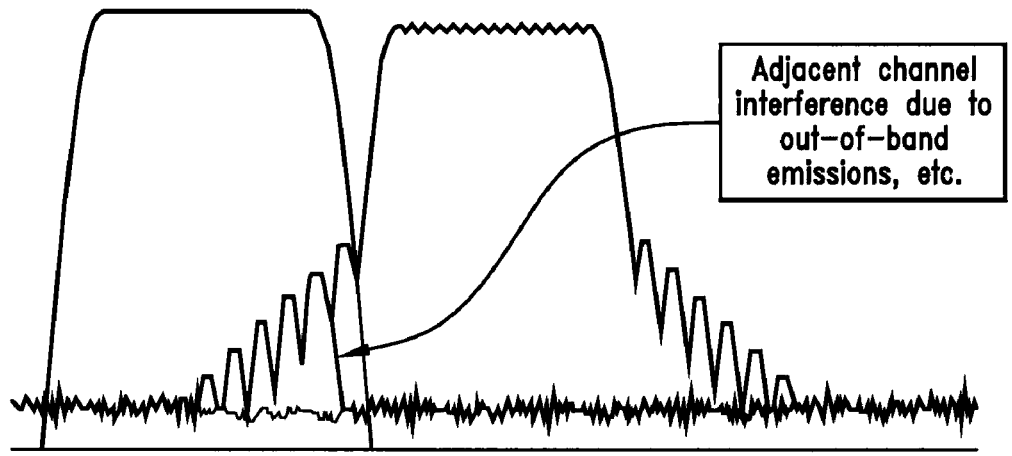
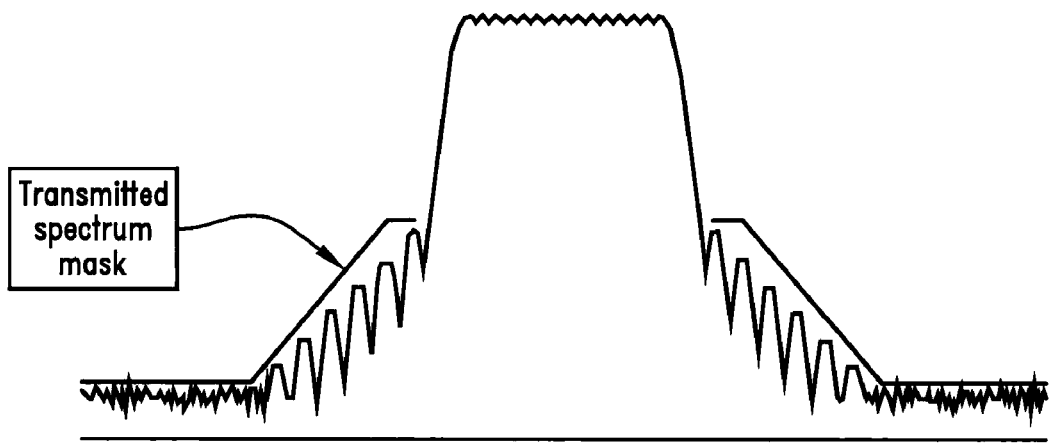
Fig. 5

2504.750 MHz, 5.5 MHz 2W Channel, 64-QAM

| | | Channel Center Freq. (MHz) | 2504.75 | | | 8/16/2005 | |
|---|---|---|---|---|---|---|---|
| | | Channel BW (MHz) | 5.5 | | | 48 VDC Nom | |
| | | Channel Bandedge – Low (MHz) | 2502 | | | 64-QAM | |
| | | Channel Bandedge – High (MHz) | 2507.5 | | | | |

| Resolution Bandwidth (kHz) | | 1 MHz Band Center Freq. (MHz) | 1 MHz Band Low Freq. (MHz) | 1 MHz Band High Freq. (MHz) | Emission Power in 1 MHz BW (dBm) | Spec (dBm/MHz) | Margin (dB) | Result |
|---|---|---|---|---|---|---|---|---|
| 1000 | -6 MHz bin | 2496.5 | 2496 | 2497 | -41.63 | -13 | -28.63 | Complies |
| | -5 MHz bin | 2497.5 | 2497 | 2498 | -40.37 | -13 | -27.37 | Complies |
| | -4 MHz bin | 2498.5 | 2498 | 2499 | -36.59 | -13 | -23.59 | Complies |
| | -3 MHz bin | 2499.5 | 2499 | 2500 | -32.27 | -13 | -19.27 | Complies |
| | -2 MHz bin | 2500.5 | 2500 | 2501 | -15.51 | -13 | -2.51 | Complies |
| 56 | -2 MHz bin | 2500.5 | 2500 | 2501 | -29.63 | -13 | -16.63 | Complies |
| | -1 MHz bin | 2501.5 | 2501 | 2502 | -23.66 | -13 | -10.66 | Complies |
| 56 | +1 MHz bin | 2508 | 2507.5 | 2508.5 | -24.29 | -13 | -11.29 | Complies |
| | +2 MHz bin | 2509 | 2508.5 | 2509.5 | -33.31 | -13 | -20.31 | Complies |
| 1000 | +2 MHz bin | 2509 | 2508.5 | 2509.5 | -14.51 | -13 | -1.51 | Complies |
| | +3 MHz bin | 2510 | 2509.5 | 2510.5 | -35.07 | -13 | -22.07 | Complies |
| | +4 MHz bin | 2511 | 2510.5 | 2511.5 | -39.10 | -13 | -26.10 | Complies |
| | +5 MHz bin | 2512 | 2511.5 | 2512.5 | -41.26 | -13 | -28.26 | Complies |
| | +6 MHz bin | 2513 | 2512.5 | 2513.5 | -41.74 | -13 | -28.74 | Complies |

*Fig. 8*

SYSTEM AND METHOD FOR CELL PLANNING IN A WIRELESS COMMUNICATION NETWORK

CROSS REFERENCE TO RELATED APPLICATION(S)

This application is a continuation-in-part of pending U.S. patent application Ser. No. 12/055,169 filed Mar. 25, 2008, which claims the benefit of U.S. Provisional Application No. 60/908,270, filed on Mar. 27, 2007.

BACKGROUND OF THE INVENTION

1. Field of the Invention

The present invention is directed generally to a wireless communications system and, more particularly, to a system and method for cell planning and cell layout within the wireless communications system.

2. Description of the Related Art

Broadband wireless communications systems are increasingly employing OFDMA (Orthogonal Frequency Division Multiple Access) as the underlying radio PHY (physical layer) technology. The extensive system design advantages of OFDMA are documented extensively in existing literature. OFDMA as a general technology has a wide scope and the industry is producing several variants and configurations that seek to achieve maximum performance. IEEE 802.16e and WiMAX standards introduced a scalable OFDMA (S-OFDMA) system architecture that enables network service providers to economically address the diverse business and regulatory wireless requirements throughout the world. IEEE P802.16-2004, *Standard for Local and Metropolitan Area Networks, Part 16: Air Interface for Fixed Broadband Wireless Access Systems*. The scalable FFT sizes, flexible channel bandwidths, and various cellular frequency reuse schemes offered by these standards produce a remarkably agile system.

Despite these progressive technical advances, all existing strategies continue to operate within a paradigm of fixed channel bandwidths that do not always permit an operator to reach optimal spectral efficiency. Therefore, it can be appreciated that there is a significant need for a spectrum allocation strategy that increases spectral efficiency and utilization. Some of these strategies, such as the strategy described in U.S. patent application Ser. No. 12/055,169 filed on Mar. 25, 2008 by the inventors of the present application may include using channels having frequency bands with overlapping portions. Therefore, a need exists for cell planning systems and methods configured for use with overlapping channels. The present invention provides this, and other advantages, as will be apparent from the following detailed description and accompanying figures.

BRIEF DESCRIPTION OF THE SEVERAL VIEWS OF THE DRAWING(S)

FIG. 5 illustrates ACLR and ACS interference data.

FIG. 8 illustrates FCC spectrum test results for one configuration of a communications system.

DETAILED DESCRIPTION OF THE INVENTION

Figures 1, 2:
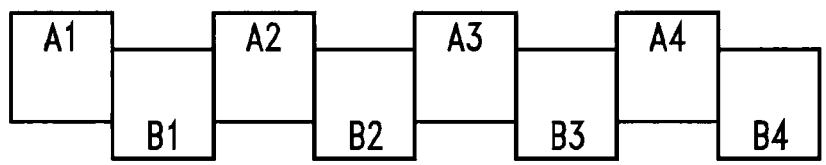
FIG. 1 illustrates WiMAX System Profiles.
FIG. 2 illustrates a pre-transition Band Plan (6 MHz channels).

Aspects of the present invention include systems and methods for cell layout or cell planning in a wireless communication network. The systems and methods are configured for use with two or more channels that have frequency bands that overlap. Such channels are referred to herein as overlapping channels. Before describing embodiments that implement aspects of the inventive cell planning systems and methods, the spectrum allocation strategy of U.S. patent application Ser. No. 12/055,169 filed on Mar. 25, 2008 by the inventors of the present application is described. While the cell planning systems and methods of present disclosure are not limited to use with this strategy, the strategy is provided to illustrate an exemplary spectrum allocations that produce one or more overlapping channels.

Exemplary Spectrum Allocation Strategy

While the examples provided herein are in the 2.5 GHz band, the exemplary spectrum allocation strategy is applicable to other portions of the spectrum. This band was previously designated as an Instructional Television Fixed Service (ITFS) and Multipoint Distribution Service (MDS) band. Under the frequency spectrum allocation originally developed by the Federal Communications Commission (FCC) the band was divided into 6 MHz channels. This portion of the spectrum today is referred to as the Educational Broadband Service (EBS)/Broadband Radio Services (BRS) spectrum. Although this portion of the spectrum is generally referred to as the EBS/BRS spectrum, it is sometimes still referred to as the ITFS/MDS spectrum.

The ITFS/MDS spectrum was originally sold in 6.0 MHz allocations by the FCC. However, this crowded portion of the spectrum was often sold in nonadjacent 6.0 MHz channels.

The ITFS/MDS (EBS/BRS) 2.5 GHz band in the United States uses 5.5 MHz channel bandwidths with unusual allocation structure that stems from the legacy analog TV designation of the band. Existing OFDMA technology standards are primarily targeting 5 MHz and 10 MHz channels that do not fit into this spectrum neatly. Ideally the standards will evolve to support this band more efficiently, but that will require lengthy ratification processes and ultimately costly hardware and software changes to many existing commercial equipment.

The exemplary spectrum allocation strategy provides a method of deploying 10 MHz WiMAX channels using overlapping channels and a novel reuse strategy, which is capable of providing significant benefits over existing channel spacing and reuse schemes. This method enables flexible system configurations that maximize spectral efficiency for OFDMA systems operating in the EBS/BRS 2.5 GHz spectrum.

IEEE 802.16e and WiMAX specify several types of physical layers for different frequency bands and system applications, and allows for both Time-Division Duplexing (TDD) and Frequency-Division Duplexing (FDD) operation. The layers referred to herein are part of the ISO/OSI model. The physical (PHY) layer refers to the lowest layer in the ISO/OSI model that describes hardware connections between devices.

Currently, the industry is largely focusing on the OFDMA PHY, TDD version for Point to Multi-point (PMP) mobile networks below 11 GHz. IEEE P802.16-2005, February 2006, *Standard for Local and Metropolitan Area Networks, Part 16: Air Interface for Fixed Broadband Wireless Access Systems, Amendment for Physical and Medium Access Control Layers for Combined Fixed and Mobile Operation in Licensed Bands and Corrigendum* 1. The WiMAX Forum has produced the concept of standardized system profiles for TDD systems, depicted in FIG. 1. PHY supports channel bandwidths of 20 MHz, 10 MHz, 5 MHz, and 2.5 MHz, with scalable FFT sizes of 2048, 1024, 512, and 128, respectively. Various OFDMA subcarrier permutations schemes are specified. FIG. 1 illustrates a number of WiMAX system profiles that include other bandwidths as well. The description of the exemplary spectrum allocation strategy presented discusses the WiMAX OFDMA TDD PHY using 5 MHz and 10 MHz channels in the 2.496-2.690 GHz band, using PUSC (Partial Usage of Subchannels). The concepts presented here may be applied to any OFDMA system, but various other implementations are possible.

OFDMA Interference Averaging

OFDMA Basics

OFDM uses many narrowband subcarrier frequencies to form a single broadband channel. An OFDM system takes a data stream and splits it into N parallel data streams, each at a rate of 1/Nth the original data rate. Each stream is then mapped onto a unique subcarrier tone. All the subcarriers are combined into a composite time domain signal for transmission. The OFDM receiver uses a time and frequency synchronized FFT to convert the OFDM time waveform back into the frequency domain. In this process, the FFT picks up discrete frequency samples, corresponding to just the peaks of the carriers. At these frequencies, all other carriers pass through zero amplitude eliminating any interference between the subcarriers. OFDM subcarriers have a sinc (sin(x)/x) frequency response resulting in overlap in the frequency domain. However, this overlap does not cause any interference due to the orthogonality of the subcarriers. These concepts are discussed in *WiMAX Nuts and Bolts: An Introduction to the IEEE 802.16e Standard*, S. Hilton, Motorola, Inc., Mar. 3, 2006.

The WiMAX 802.16e OFDMA PHY uses a technique known as subchannelization, which partitions the OFDM subcarrier tones into groups that form logical subchannels and encodes symbols onto the subchannels. WiMAX subchannelization is referred to as OFDMA (Orthogonal Frequency Division Multiple Access) because the subchannels provide a mechanism to multiplex symbols to multiple subscribers in each frame. These subchannels are dynamically allocated among all users on a continuous basis, according to bandwidth requirements.

Interference Mitigation Strategies

The two basic and vital requirements for any efficient cellular system are:

Avoid/minimize intra-cell interference (co-channel, within the cell).

Avoid/average inter-cell interference (co-channel and adjacent-channel, neighboring cells).

There are three primary categories of techniques to manage interference in cellular radio systems:

1. Interference Avoidance
    Detect and avoid—i.e. Carrier Sense Multiple Access (CSMA) as with Ethernet
    Frequency planning
    Power control
    Resource coordination
        Timeslot allocation as in TDMA
        Multi-dimensional MAC scheduling
2. Interference averaging
    Orthogonal codes such as CDMA
    Frequency diversity spreading, example 802.16e PUSC subchannelization
3. Interference Mitigation/Cancellation—Smart Antennas, or Multi-Antenna Signal Processing (MAS)
    Receive/transmit diversity and combining techniques to provide signal-to-noise-ratio (SNR) gains. Examples include Alamouti Space-Time-Codes (STC) and Maximum Ratio Combining (MRC).
    Interference rejection techniques to provide signal-to-noise+interference (SINR) gains. Examples include adaptive spatial filtering, active beam/null steering.
    Spatial Multiplexing—coherent processing to resolve multiple discreet information streams from the same radio channel in different physical space. Examples include spatial division multiple access (SDMA) and MIMO.

Virtually all cellular radio technologies have employed one or more of the above interference mitigation techniques and are typically able to achieve one of the two primary cellular design requirements. No existing mainstream cellular technology achieves both of the requirements completely.

The WiMAX OFDMA system uses all three interference mitigation techniques (avoidance, averaging, and mitigation/cancellation): frequency planning, power control, advanced resource scheduling, interference averaging, and several multi-antenna signal processing strategies. OFDM subchannelization introduces a paradigm shift for managing cellular RF interference. WiMAX system design is seeking to achieve maximum spectral efficiency by utilizing all these interference mitigation techniques in concert to achieve both of the primary system design goals: minimize both intra-cell and inter-cell interference.

OFDMA Subchannelization, Permutations, and Interference Averaging

The core purpose of WiMAX subchannelization is the mitigation of inter-cell (co-channel and adjacent-channel) interference through averaging. Those skilled in the art will appreciate that OFDM technology establishes a broadband channel using many narrow band carriers or tones. The process of multiple access using OFDMA subdivides the tones into groups allocated to different users. This technology is well known in the art and need not be described in greater detail herein. Those skilled in the art having knowledge of WiMAX will also appreciate that groups of tones are referred to as "subchannels." WiMAX has many different approaches to OFDMA. Among these are PUSC, FUSC, and AMC. Each of these approaches is known in the art and will not be described in greater detail herein.

The WiMAX frame structure specifies PUSC as the mandatory zone and several optional zones such as FUSC, AMC, etc. Each zone has a slightly different mechanism for allocating the subchannel tones, which create slightly different optional systematic approaches for management of interference in the network—that topic is beyond the scope of this document. This section focuses only on the mandatory PUSC zone to illustrate the general concept interference averaging. In the WiMAX PUSC zone, the allocation of OFDM tones is a dynamic, randomized scheme that varies the subcarriers according to a unique permutation code. Each user's traffic is "spread" across a range of constantly changing subsets of the OFDM tones, producing a high degree of statistical frequency diversity in the system.

As in any cellular system, a base station (BS) has a plurality of sectors that will have overlapping areas of RF coverage where some subscriber's channels will collide with others; this traditionally creates "pockets" of high co-channel interference, which can be measured as a carrier to interference (C/I) ratio. In the OFDMA system, among co-channel and adjacent-channel PUSC subscribers on neighboring cells within in a system, the chances that the specific pattern of tones that comprise one user's subchannel on one sector will coherently interfere with another user on the same or adjacent channel on a nearby sector at the same time are greatly minimized. In this manner, inter-cell interference is statistically averaged to lower levels for all users.

EBS/BRS Spectrum

As previously discussed, the ITFS/MDS spectrum was originally allocated in 6.0 MHz blocks. Following the transition to the EBS/BRS spectrum, the channel allocation and usage was altered, as described below. In markets under the pre-transition 6 MHz channel plan, spectrum is typically allocated in interleaved blocks, of four 6 MHz channels. For example, an A and B block are shown in FIG. 2. Each block (e.g., block A1) comprises four 6 MHz channels. Under the old plan, one of those four channels was designated as a special purpose high-power channel that was not available for general use.

Figure 3:
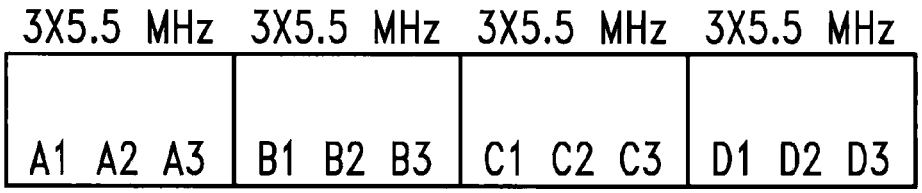
FIG. 3 illustrates a post-transition Band Plan (5.5 MHz channels).

In markets under the post-transition 5.5 MHz plan, three of the channels are reduced to 5.5 MHz bandwidth and relocated to form a contiguous block of spectrum. The fourth channel (i.e., the special purpose high-power channel) remains at 6 MHz of bandwidth and is relocated to a portion of the band set aside for high power video operation. The newly formed block of 16.5 MHz is comprised of three 5.5 MHz channels and is intended for cellular deployments such as WiMAX. An example, A, B, C, and D blocks are shown in FIG. 3. In this example, A1 is 5.5 MHz, A2 is 5.5 MHz, and A3 is 5.5 MHz, thus forming a 16.5 MHz contiguous block.

WiMAX Channel Bandwidth and Reuse Configurations

Channel Bandwidth

The WiMAX standards support various channel bandwidths. In the United States, these are 5, 10, 15, and 20 MHz. For practical implementations, both the 5 MHz and 10 MHz channel bandwidths are currently being considered.

Frequency Reuse

WiMAX re-use terminology uses the following format: BTS/Sector/Channel

WiMAX standards promote two primary re-use schemes:
1/3/3 (1 BTS, 3 sectors, 3 channel)—re-use 3
1/3/1 (1 BTS, 3 sectors, 1 channel)—re-use 1

The terminology used herein refers to the base station, number of sectors, and number of channels (i.e., frequencies) of operation. For example, the designation 1/3/3 refers to a BTS having three sectors and three channels. Under this designation, each sector has its own channel or frequency of operation. In contrast, the designation 1/3/1 refers to a single base station with three sectors and only one channel. Under this scheme, each of the three sectors utilizes the same channel or frequency of operation.

A 1/3/1 configuration has reduced performance compared to 1/3/3 due to increased interference, but depending on load, distribution can take advantage of increased peak throughputs via statistical multiplexing of traffic.

Default System Configuration Options

This section describes how a WiMAX OFDMA PUSC 1/3/3 system using 5 MHz and 10 MHz channels may operate within the EBS/BRS band, using existing reuse strategies. Two 5 MHz systems can be said to provide equal bandwidth to one 10 MHz system, however in reality, the 10 MHz configuration offers significant benefits with regard to peak subscriber data rates and protocol efficiencies—thus 10 MHz is preferred.

5 MHZ Channel Configuration

Three 5 MHz channels in a 1/3/3 reuse scheme could be used in each 16.5 MHz EBS/BRS block. For capacity equal to a 10 MHz system, two blocks (6 channels, 33 MHz) would be required. These could be utilized for maximum capacity by extending the re-use scheme to 1/3/6, or in a stacked site/sector configuration (2 overlaid 5 MHz 1/3/3 systems). In either configuration, a total of six 5 MHz channels in the available six 5.5 MHz channel allocations results in 1.5 MHz unused bandwidth for each block, wasting a total of 3 MHz.

10 MHz Channel Configuration

Alternatively, 10 MHz channels could be used in a single 1/3/3 configuration. Each 10 MHz channel would require two 5.5 MHz channels out of each 16.5 MHz block. Since a total of 30 MHz is required for three channels, there are two potential ways to achieve this configuration:

a) One possible configuration would require two sets of adjacent EBS/BRS blocks, 33 MHz spectrum total. In this configuration, three 10 MHz channels could be made up of three paired (adjacent) 5.5 MHz channels. Under this configuration, each 10 MHz channel would be formed out of two 5.5 MHz paired channels resulting in 1 MHz unused bandwidth for each 11 MHz of spectrum. For three 10 MHz channels, this again wastes a total of 3 MHz. More importantly, 2.5 GHz operators may not have two adjacent blocks in every market.

b) Alternatively, three sets of non-adjacent EBS/BRS blocks could be used, 49.5 MHz of spectrum total. In this configuration, each 10 MHz channel could be made up of two adjacent 5.5 MHz channels out of each block. This would use only 10 MHz out of every 16.5 MHz block, leaving 6.5 MHz unused for each block, or 19.5 MHz total unused. Clearly, this is a massive waste of spectrum. Also, operators may not have this amount of spectrum available in every market.

Summary: Using default WiMAX 1/3/3 reuse, 5 MHz channels in any 1/3/3 configuration leaves 3 MHz or 9% wasted spectrum. The best case 10 MHz 1/3/3 configuration also results in at least 3 MHz or 9% wasted spectrum. The 10 MHz channel configuration is by far the preferred deployment, but may not be feasible due to lack of adjacent blocks or lack of total required amount of spectrum.

Condensed Frequency Reuse Scheme

One concept underlying the condensed frequency reuse scheme described herein is to fully leverage the many advanced interference mitigation techniques of WiMAX, namely OFDMA interference averaging to permit overlapping 10 MHz channels and facilitate a four channel reuse scheme. As will be described in greater detail below, the 16.5 MHz can be allocated to four 5.0 MHz channels. However, in many system implementations 10.0 MHZ channels are desired. In systems where each BS uses three sectors, three channels are required for a 1/3/3 reuse scheme. Implementation of 10.0 MHz channels in a 1/3/3 reuse scheme requires two blocks of 16.5 MHz (a total of 33.0 MHz). In a 1/3/3 reuse scheme, three of the four 10.0 MHz channels are used for the three sectors. The fourth 10.0 MHz channel can be used to provide coverage for "hot spots," thus providing a 1/3/4 reuse scheme. Alternatively, each BS can be divided into four sectors thus providing a 1/4/4 reuse scheme that utilize all four of the 10.0 MHz channels. Exemplary cellular networks configured to implement 1/3/3 and 1/3/4 reuse schemes are described below.

The 33 MHz of total spectrum is fully utilized by allowing each pair of 10 MHz channels to overlap within a 16.5 MHz portion of the spectrum. A 1/3/4 or 1/4/4 configuration would be created by running two 10 MHz channels in each EBS/BRS block, creating a total of four 10 MHz channels out of two 16.5 MHz blocks that do not have to be adjacent. For example, the blocks A1-A3 and C1-C3 could be used to provide the four 10.0 MHz channels if those non-adjacent blocks are all that are available to a service provider in a particular geographic region.

System Configuration & Impact Analysis

The following sections analyze the exemplary spectrum allocation strategy in detail. The table below summarizes 802.16e OFDMA system parameters for both 5 and 10 MHz systems that will be used for calculations in the following sections.

|  | 5 MHz | 10 MHz |
|---|---|---|
| Frequency | 2.5 GHz | 2.5 GHz |
| Frequency re-use scheme | 1/3/3 | 1/3/3 |
| Permutation Scheme | PUSC | PUSC |
| Frame Duration (ms) | 5 | 5 |
| FFT size | 512 | 1024 |
| Frame Duration (symbols) | 48.61 | 48.61 |
| Cyclic Prefix - % symbol duration | 0.125 | 0.125 |
| Total Symbol Duration (us) | 102.86 | 102.86 |
| Useful Symbol Duration (us) | 91.43 | 91.43 |
| Inter-Carrier Spacing (kHz) | 10.9375 | 10.9375 |
| Total Subcarriers | 512 | 1024 |
| Guard Subcarriers (left) | 46 | 92 |
| Guard Subcarrier (right) | 46 | 92 |
| Used Subcarriers | 420 | 840 |
| Pilot Subcarriers | 60 | 120 |
| Data Subcarriers | 360 | 720 |
| Downlink Subchannels | 15 | 30 |
| Uplink Subchannels | 17 | 35 |

The 10 MHz channel has a total of 1024 tones (subcarriers). At each end of the 10 MHz channel there are 92 guard tones resulting in a total of 184 unused tones per 10 MHz channel. These guard tones are not actually transmitted, leaving 840 tones available for use. The actual occupied bandwidth of a 10 MHz channel is calculated by multiplying the inter-carrier-spacing by the number of used subcarriers:

$$10.9375/1000 \times 840 = 9.1875$$

->Total occupied bandwidth of a 10 MHz channel=9.1875 MHz

Figure 4:
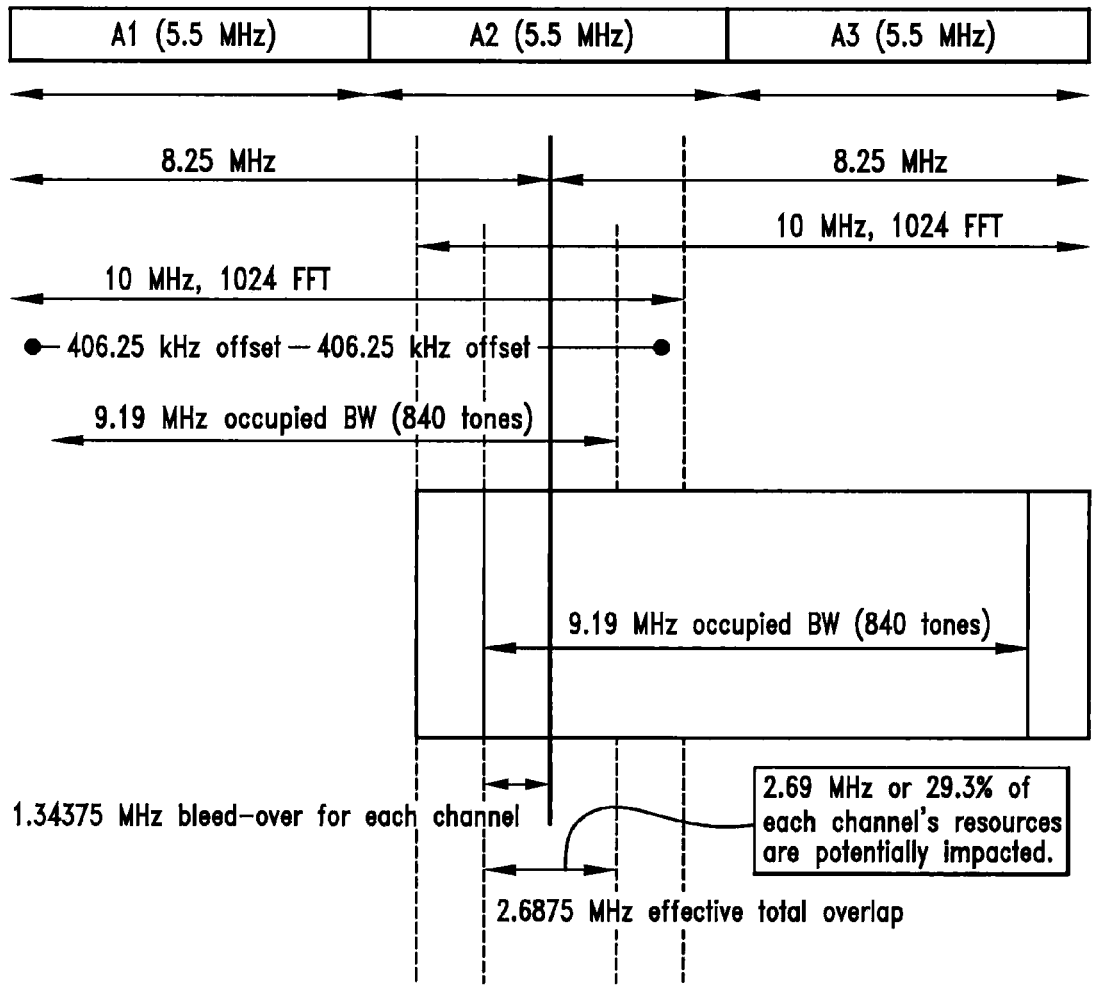
FIG. 4 illustrates a condensed frequency reuse diagram.

The diagram of FIG. 4 illustrates the basic layout of a block. This example shows two overlapping channels within a single 16.5 MHz ITFS "A" block utilizing center frequencies derived from conventional 10 MHz planning.

Basically, the method divides 16.5 MHz of spectrum into two 8.25 MHz channels, and "stuffs" the actual 9.1875 MHz of occupied spectrum of each of a pair of 10 MHz channels into one of the 8.25 MHz channels. Obviously, there will be overlap. The actual impact of the overlap depends on many configuration and deployment factors, with various considerations and tradeoffs. The following sections provide detailed analysis of these issues.

System Engineering Perspectives

Spectrum "Usability" Analysis

The diagram in FIG. 4 shows a configuration where the center frequencies of WiMAX channels are chosen such that the outer edges of each 10 MHz channel are aligned with the respective outer edges of the 16.5 MHz EBS/BRS block. This configuration naturally uses up all available spectrum in the block, while minimizing the size of the overlap region of the two channels. The size of the overlap region is calculated as follows.

First, the amount of guard band (or guard tone) spectrum utilized on each end of a 10 MHz channel is calculated. This amount is the "offset" where the edge of the occupied channel bandwidth starts in from the edge of the EBS/BRS block. This is referred to as the "occupied bandwidth offset":

$$10 - 9.1875 = 0.8125$$

$$0.8125/2 = 0.40625$$

Within the context of a 10 MHz WiMAX channel, the actual guard bandwidth at each channel edge is 406.25 kHz.

Next, the difference between the amount of occupied spectrum of one 10 MHz channel and the amount of spectrum of one 8.25 MHz channel (i.e, half of one 16.5 MHz EBS/BRS block) is calculated. This is referred to as the "occupied bandwidth delta":

$$16.5/2 = 8.25$$

$$9.1875 - 8.25 = 0.9375$$

Finally, the "occupied bandwidth offset" is added to the "occupied bandwidth delta":

$$0.40625 + 0.9375 = 1.34375$$

This means that a single 10 MHz channel will overlap into the other by 1.34375 MHz. Because two channels overlap simultaneously, the total overlap region that is felt by both channels is:

$$1.34375 \times 2 = 2.68750$$

This means that 2.68750 MHz worth of each WiMAX channel in a single EBS/BRS block would potentially experience interference from the other. Normally, a 10 MHz WiMAX channel has an actual occupied bandwidth of 9.1875 MHz. The above calculation shows that the amount of occupied bandwidth that is potentially affected by the overlap is 29.3% (2.6875/9.1875=0.2925).

However, because four channels may be allocated from 33 MHz of spectrum as compared to three, the four channel scheme realizes a 23% increase in spectrum usage for markets with non-adjacent 16.5 MHz EBS/BRS block allocations, and only a 5% reduction compared to the best-case default WiMAX reuse schemes used in markets with adjacent 16.5 MHz EBS/BRS blocks. Further, such a configuration would permit a mature network to realize the benefits of running 10 MHz channels (higher user peak data rates, single bandwidth devices, etc) while achieving maximum spectral efficiency with 33% less sectors than the maximum possible 5 MHz system.

To illustrate these issues, the following section shows a comparison of the various WiMAX 1/3/3 reuse deployment options in 5 MHz and 10 MHz channels and the 10 MHz condensed reuse 1/3/4 and 1/4/4 plans. A summary metric called "total spectral usability" may be defined as the ratio of actual occupied bandwidth and total used spectrum.

Default WiMAX 5 MHz 1/3/3 Scheme (2 Non-Adjacent ITFS Blocks)
- ITFS/MDS (EBS/BRS) blocks used: 2
- Total spectrum used: 33.0 MHz
- Total channels available in 33 MHz: 6
- Total Subcarriers: 512
- Total Guard Carriers: 92 (46×2)
- Used Subcarriers: 420
- Occupied Bandwidth: 4.59 MHz (10.9375/1000×420=4.59375)
- Total Occupied Bandwidth: 27.56 MHz (4.59375×6=27.56250)
- Total spectral usability: 84% (27.56250/33.0=0.8352)
- Number of sectors per site: 6

Default WiMAX 10 MHz 1/3/3 Scheme (2 Adjacent ITFS Blocks)
- ITFS/MDS (EBS/BRS) blocks used: 2
- Total spectrum used: 33.0 MHz
- Total channels available in 33 MHz: 3
- Total Subcarriers: 1024
- Total Guard Carriers: 184 (92×2)
- Used Subcarriers: 840
- Occupied Bandwidth: 9.19 MHz (10.9375/1000×840=9.1875)
- Total Occupied Bandwidth: 27.56 MHz (9.1875×3=27.56250)
- Total spectral usability: 84% (27.56250/33.0=0.8352)
- Number of sectors per site: 3

Default WiMAX 10 MHz 1/3/3 Scheme (3 Non-Adjacent ITFS Blocks)
- ITFS/MDS (EBS/BRS) blocks used: 3
- Total spectrum used: 49.5 MHz
- Total channels available in 49.5 MHz: 3
- Total Subcarriers: 1024
- Total Guard Carriers: 184 (92×2)
- Used Subcarriers: 840
- Occupied Bandwidth: 9.19 MHz (10.9375/1000×840=9.1875)
- Total Occupied Bandwidth: 27.56 MHz (9.1875×3=27.56250)
- Total spectral usability: 56% (27.56250/49.5=0.5568)
- Number of sectors per site: 3

10 MHz Condensed Reuse 1/3/4 Scheme (2 Non-Adjacent ITFS Blocks)
- ITFS/MDS (EBS/BRS) blocks used: 2
- Total spectrum used: 33.0 MHz
- Total channels available in 33 MHz: 4
- Total Subcarriers: 1024
- Total Guard Carriers: 184 (92×2)
- Used Subcarriers: 840
- Occupied Bandwidth (Worst Case): 6.50 MHz (9.1875−2.6875=6.50)
- Total Occupied Bandwidth: 26.0 MHz (6.50×4=26.0)
- Total spectral usability: 79% (26.0/33.0=0.7878)
- Number of sectors per site: 3

10 MHz 1/4/4 condensed reuse scheme (2 non-adjacent ITFS blocks)
- ITFS/MDS (EBS/BRS) blocks used: 2
- Total spectrum used: 33.0 MHz
- Total channels available in 33 MHz: 4
- Total Subcarriers: 1024
- Total Guard Carriers: 184 (92×2)
- Used Subcarriers: 840
- Occupied Bandwidth (Worst Case): 6.50 MHz (9.1875−2.6875=6.50)
- Total Occupied Bandwidth: 26.0 MHz (6.50×4=26.0)
- Total spectral usability: 79% (26.0/33.0=0.7878)
- Number of sectors per site: 4

The above analysis uses 2.6875 MHz as the per-channel overlap reduction—this represents a very conservative, "worst-case" scenario. In reality, the increased interference due to overlap would only be felt at cell edges of sectors utilizing the overlapping channels. There are several methods to deploy four channels in the network, all of which may be optimized to minimize the actual regions in the network where the overlap interference would exist. Exemplary cellular networks configured to deploy four channels, which include two pairs of overlapping channels, are described below.

Further, the overlap situation should only cause the full impact under heavy load. Because WiMAX OFDMA subchannelization offers interference averaging benefits and MAC schedulers will allocate subchannel channel resources based on channel conditions and QoS requirements, the actual impact of this overlap will be far less for much of the time and certainly on networks that are not fully loaded. These issues are discussed in greater detail below.

Interference, PUSC and MAC Scheduling Benefits

The factors that determine actual interference levels experienced by real world OFDMA systems are very diverse. The following list shows some of the many factors that need to be considered:
- Transmitter out of band and spurious emission levels
- Transmitter linearity
- Receiver selectivity
- Receiver blocking performance
- Net filter discrimination
- Regulatory power limitations
- Antenna discrimination (BS-to-BS interference)
- Antenna discrimination (BS-to-SS/SS-to-BS interference)
- Antenna azimuths & polarizations
- Specific channel bandwidths
- Power control
- Smart antenna implementations, Active interference cancellation techniques
- Physical BS and MS locations
- Traffic patterns of the mobile subscribers
- OFDMA subchannel allocations
- Shielding techniques,
- Frequency planning
- Inter-operator cooperation and coordination
- TDD synchronization
- BS and MS antenna location coordination System level simulations can be performed to understand the impact of some of these issues; however, the most advanced simulation platform in the world cannot possibly capture all these elements. In light of this, at a high level, interference in any OFDMA deployment is a highly dynamic and multi-dimensional issue.

The previous sections described the bandwidth overlap impact from a worst-case interference perspective, as if the overlapping OFDMA subcarrier resources were totally unusable at all times. In reality, even though roughly 15% of the useful subcarriers in each 10 MHz channel may overlap with the other channel, these resources are still available and usable most of the time for traffic channels. The overlapping subcarriers will simply experience more interference than the other subcarriers as load increases. Ultimately, there are two primary elements of WiMAX OFDMA system that will determine the level of performance degradation:

1) In PUSC (Permuted Usage of Subchannels), the OFDMA tones and the traffic subchannels are permuted among users and sectors—this frequency diversity creates a form of interference averaging. All users' data transmissions are spread over various frequencies, statistically lowering interference for everyone. This is a fundamental element of 802.16e OFDMA system design.

2) Advanced MAC schedulers will provide some ability to mitigate the negative effect of the overlap. MAC scheduling algorithms will allocate the OFDMA subchannels based on Signal-to-Noise Interference (SINR), Quality of Service (QoS) and other metrics. As subchannels in the overlap zone experience increased interference, the scheduler will avoid these resources where possible.

Essentially, the overlap zone increases the statistical chance of interference in the OFDMA resource pool. The performance degradation of the overlap scheme can be characterized as a reduction in average SINR. This SINR value will be a statistical function of subscriber/traffic loading. It is not constant throughout the cell; like all co-channel inter-cell interference, it will be felt at the cell-edge and other propagation "pockets" of low C/I in the radio network. The interference averaging and scheduling benefits described above will mitigate these affects, as they do for the system in general. When the system is lightly loaded, the impact of the overlapping channels is minimal. As load increases, the overlap zone is proportionally worse as it is exposed to the interference of both channels.

Adjacent Channel Performance (ACP)

Emission limits for OFDMA systems are controlled by standard specifications and regional regulations. Guard bands are used to provide protection for adjacent channels. Since the condensed reuse scheme does not make use of the protection offered by the OFDMA guard subcarriers of the inner, overlapping edges the 10 MHz channel, adjacent channel performance issues must be carefully analyzed. If transmitters have a broad spectral mask, or receivers have poor filtering, then the interference could extend further into the overlapping channel than the previous analysis assumed.

Spectral mask performance is a function of design tradeoff decisions associated with the BS and mobile station (MS) transmitters and receivers, power amplifiers, filtering, antenna design, etc. TDD systems transmit and receive at different times utilizing synchronized timing, which by definition eliminates the two dominant interference scenarios that most FDD cellular systems face: BS to BS interference and MS to MS interference. Further, the BS radio equipment is usually higher performance than the corresponding MS radio equipment. This means that for OFDMA systems, Adjacent Channel Performance (ACP) would primarily only manifest itself as inter-cell, MS to MS interference at cell edge.

ACP system impact is a function of both unwanted transmitter emissions and the ability of the receiver filtering to reject them. Transmitter emissions are typically characterized in terms of Adjacent Channel Leakage Ratio (ACLR), which is the portion of the transmitter power that leaks into the receiver channel. This measurement is performed at the MS receiver where the BS transmitter transmits on one channel and the MS receiver measures leakage into the adjacent channel.

Receiver performance is typically characterized in terms of Adjacent Channel Selectivity (ACS), which measures the amount of power that is picked up by the overlap of the receiver bandwidth and the transmitter bandwidth. The diagram of FIG. 5 illustrates potential interference through both poor ACLR and non-ideal ACS. FIG. 5 is taken from a reference entitled Service Rules to Support Technology Neutral Allocations, FDD/TDD Coexistence, WiMAX Forum, January 2007. The top drawing in FIG. 5 illustrates the "ideal" transmitted spectrum as well as a "theoretical" actual transmitted spectrum. The top drawing of FIG. 5 also illustrates an "ideal" receive filter for an adjacent channel. The middle drawing of FIG. 5 illustrates adjacent channel interference due to out-of-band emissions from the theoretical actual transmitted spectrum. The transmitted spectrum mask illustrated in the bottom drawing of FIG. 5 is an envelope illustrating the maximum allowable out-of-band emissions. As will be discussed in greater detail below, actual performance characteristics are far better than the "theoretical" characteristics illustrated in FIG. 5.

Figure 6:
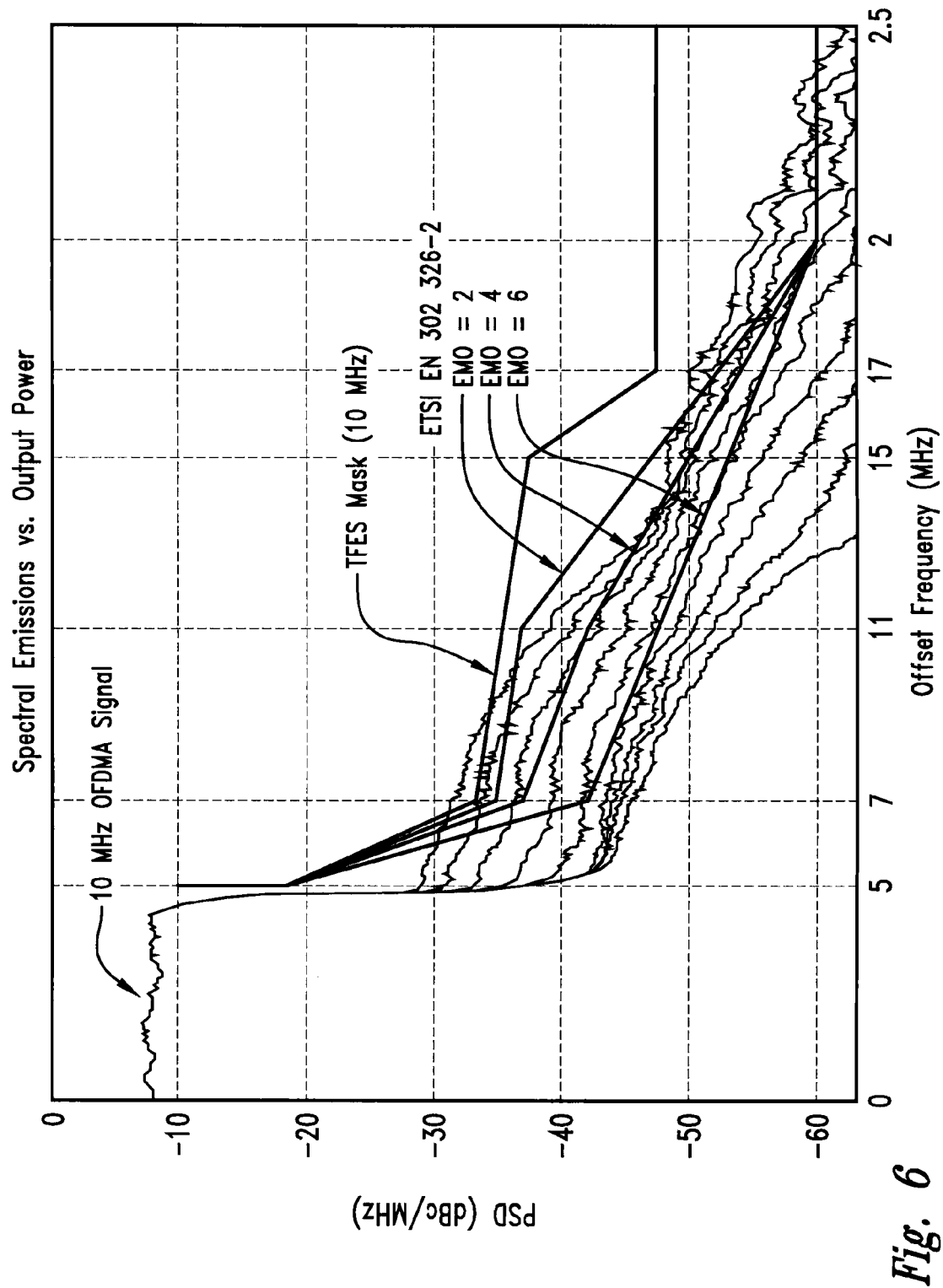
FIG. 6 illustrates transmitter spectral emissions vs. output power.

The plot of FIG. 6, taken from reference Inter-System MWA MS to MSA MS Coexistence Analysis in 3.5 GHz Band for Unsynchronized TDD Systems or TDD Adjacent to FDD Systems, CEPT, Electronics Communications Committee, Doc. SE19(06)70, November, 2006, shows spectrum data captured from a 3G WCDMA PA, using a 10 MHz OFDMA modulated signal, at different levels of output power. It also compares the spectrum data with the emission limits of several regulatory proposals.

Figure 7:
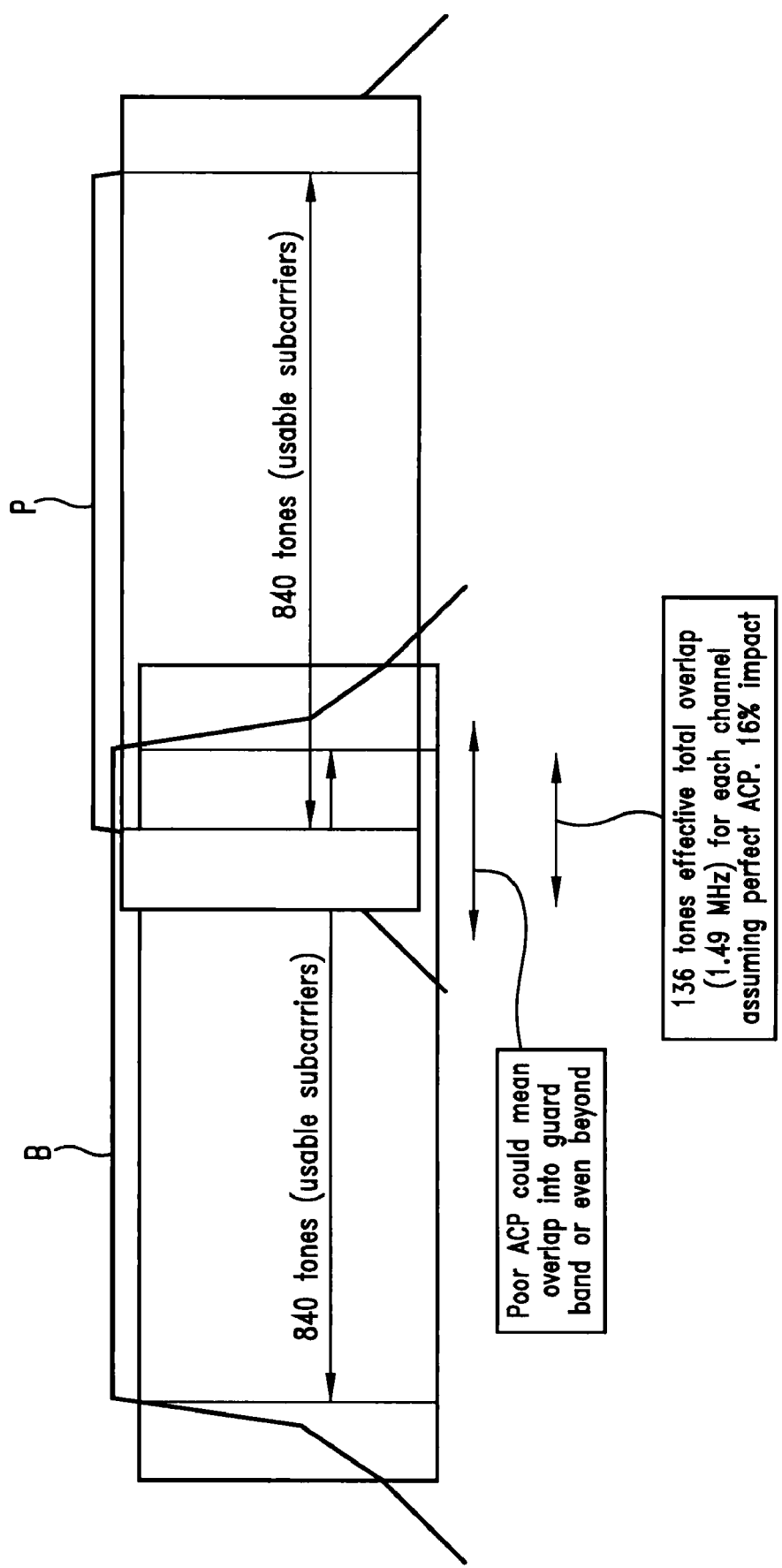
FIG. 7 illustrates an ACP diagram.

The diagram of FIG. 7 illustrates the potential impact of a worst case adjacent channel performance to the condensed reuse overlapping channel scenario. The bold line B and the bold line P depict two overlapping channels, each with a very poor spectral mask that exceeds far beyond even the guard tones.

To examine real world ACP impact potential, spectral mask measurement data for two systems were analyzed. The first system is a pre-WiMAX NextNet Expedience OFDM base station. The table of FIG. 8, taken from a document referred to as Test Report FCC Part 27, FCC ID: PHX-MMDS-BASE2, NextNet Wireless, Inc, Oct. 11, 2005, shows an FCC Compliance test report for a 5.5 MHz OFDM channel using 64QAM modulation. FCC spectral mask requirements for the EBS/BRS band call for attenuation at band-edge of 43+10*log(P), which basically translates to −13 dBm. The spectral mask performance was excellent, well below the regulatory requirements. Measurements closest to the band edge (1 MHz bin) at the tightest resolution bandwidth (RBW) (i.e., 56 kHz) were an impressive −24.29 dBm.

Figure 9:
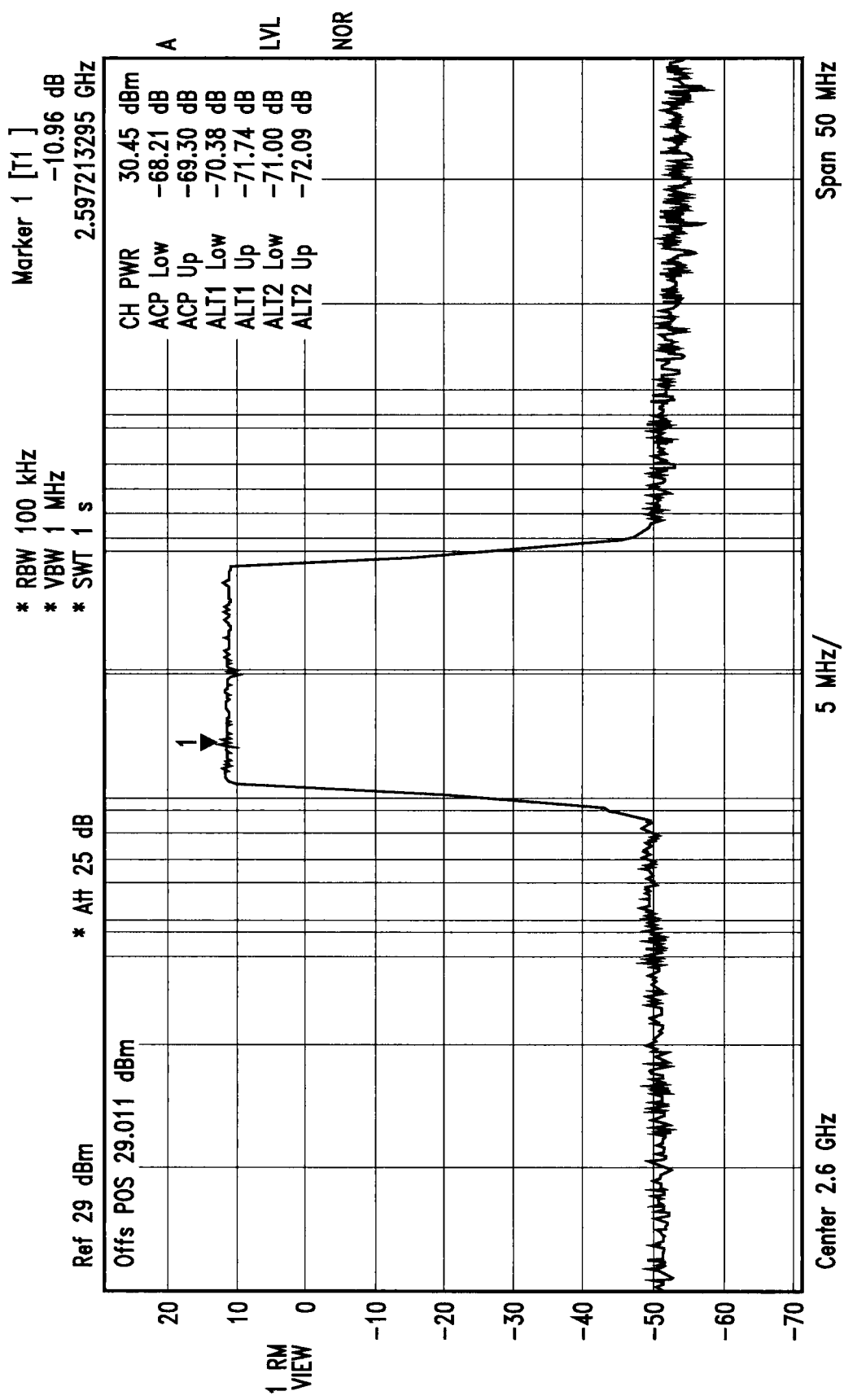
FIG. 9 illustrates out-of-band emissions plot for a 10 MHz channel in another communications system.

The second system was a Motorola WiMAX 802.16e DAP base station. The diagram of FIG. 9, taken from reference Out-of-Band Emissions Plot for 10 MHz Channel (DAP), Motorola Labs, Nov. 16, 2006, shows an out-of-band-emissions plot for a 10 MHz OFDMA channel, as measured on a prototype system in Motorola labs (100 kHz RBW with ACP measurements shown in 1 MHz measurement BW). Performance for this system is even better than the system measurements illustrated in FIG. 8; high and low ACP results are roughly −40 dBm. This plot is very useful as it depicts the precise channel configuration described in this paper. By analyzing the spectrum plot in detail, one can see that the occupied bandwidth does not go beyond the 9.18 MHz at significant power levels until nearly the full 10 MHz channel edge. The point where the channel emission exceeds the full 10 MHz channel bandwidth occurs at roughly −30 dBm.

This implies that ACP would not cause significant impact beyond the assumed overlap zone discussed in previous sections. The actual data illustrated in FIGS. 8-9 demonstrate performance that far exceeds the "theoretical" out-of-band emissions illustrated in FIG. 5. Thus, it is believed that channels can be tightly spaced, and even have some overlap, without serious impact on overall system performance. Such condensed frequency reuse is discussed below.

FCH and DL-MAP Considerations

Figure 10:
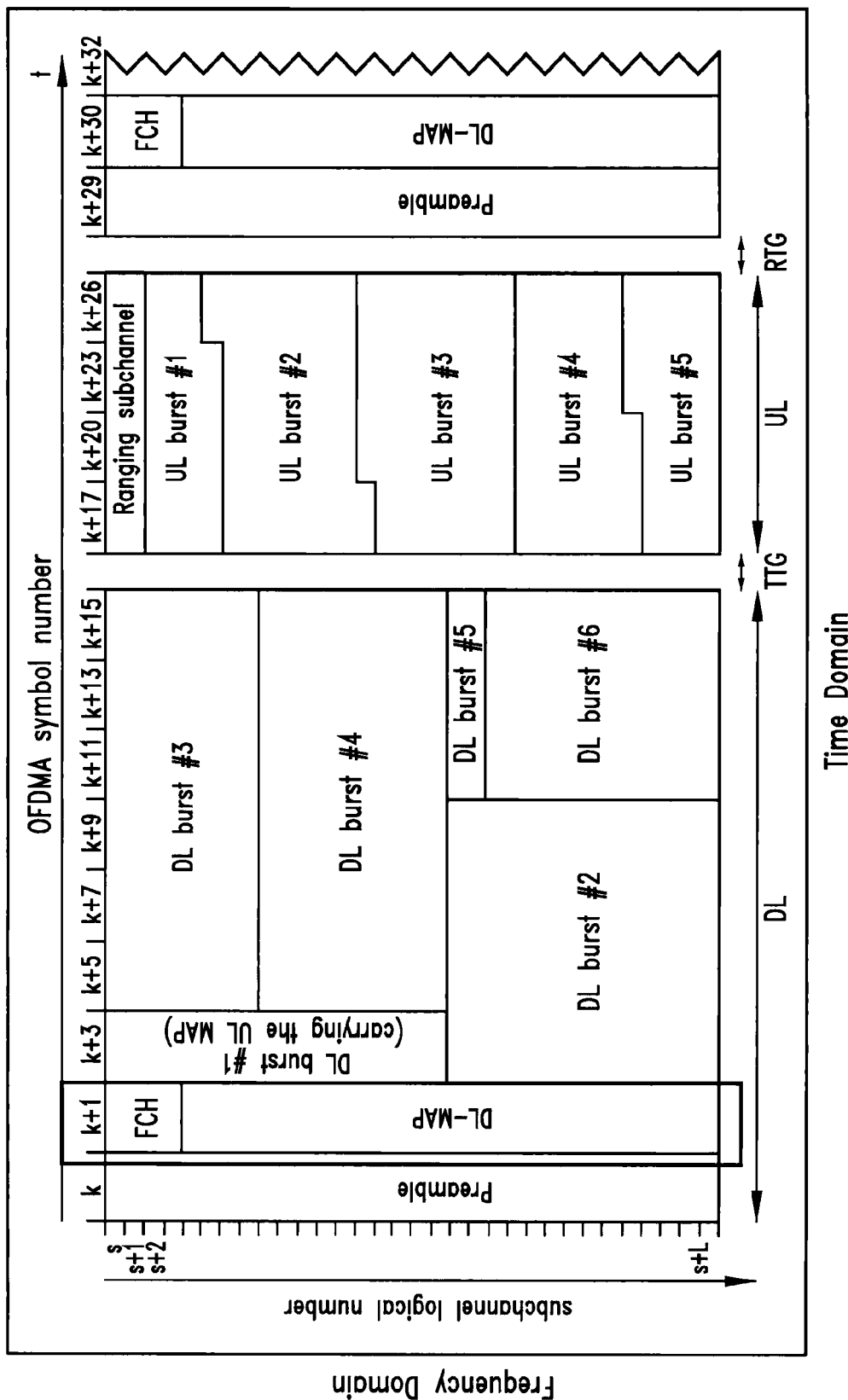
FIG. 10 illustrates the 802.16e OFDMA Time Division Duplexing frame structure.

WiMAX has a unique and dynamic framing structure that depends on very reliable reception of control channel headers. Specifically, the Frame Control Header (FCH) and a downlink map (DL-MAP) are part of each and every WiMAX frame and must be decoded properly. Any potential to impact these control channels needs to be carefully analyzed. The diagram of FIG. 10 shows the 802.16e OFDMA TDD frame structure.

The FCH and DL-MAP are related—they occur in the first mandatory PUSC zone of each frame and together provide a mapping for the rest of the WiMAX frame structure. The FCH defines the format of the DL-MAP, and the DL-MAP in turn describes the zone/burst structure of the entire downlink and uplink portions of the frame. These portions of the frame must be decoded in order for the rest of the frame and traffic subchannels to be received.

In WiMAX, the term "slot" refers to a combination of subchannels in the frequency domain per OFDM symbol in the time domain. Subchannels, in turn are comprised of individual subcarrier frequencies. Subchannels are numbered logically—their grouping and physical subcarrier mappings are re-ordered according to complex permutation formulas on a per-symbol basis.

The FCH always occurs in the first four slots (OFDM symbols) of each frame. The DL-MAP is mapped to the first slots immediately following the FCH, and continuing to the next slots as necessary. What this means is that the FCH and DL-MAP will occupy all available data subchannels (frequencies) for at least the first the first 5 OFDM symbols (time domain). This exact total number of slots occupied depends on traffic load and type (i.e., more subscribers require more DL-MAP overhead); this value is typically modeled as 6-8 symbols.

Because FCH and DL-MAP will fully occupy all subcarriers in the first few slots of each frame, they represent a "fully loaded" system scenario—all subcarrier tones in these portions of the frame are guaranteed to always interfere with any other BS using the same subcarrier tones. For this reason, inter-sector and inter-BS co-channel FCH and DL-MAP interference are a very critical design aspect of the WiMAX network, essentially the limiting factor that determines cell radius.

Figure 11:
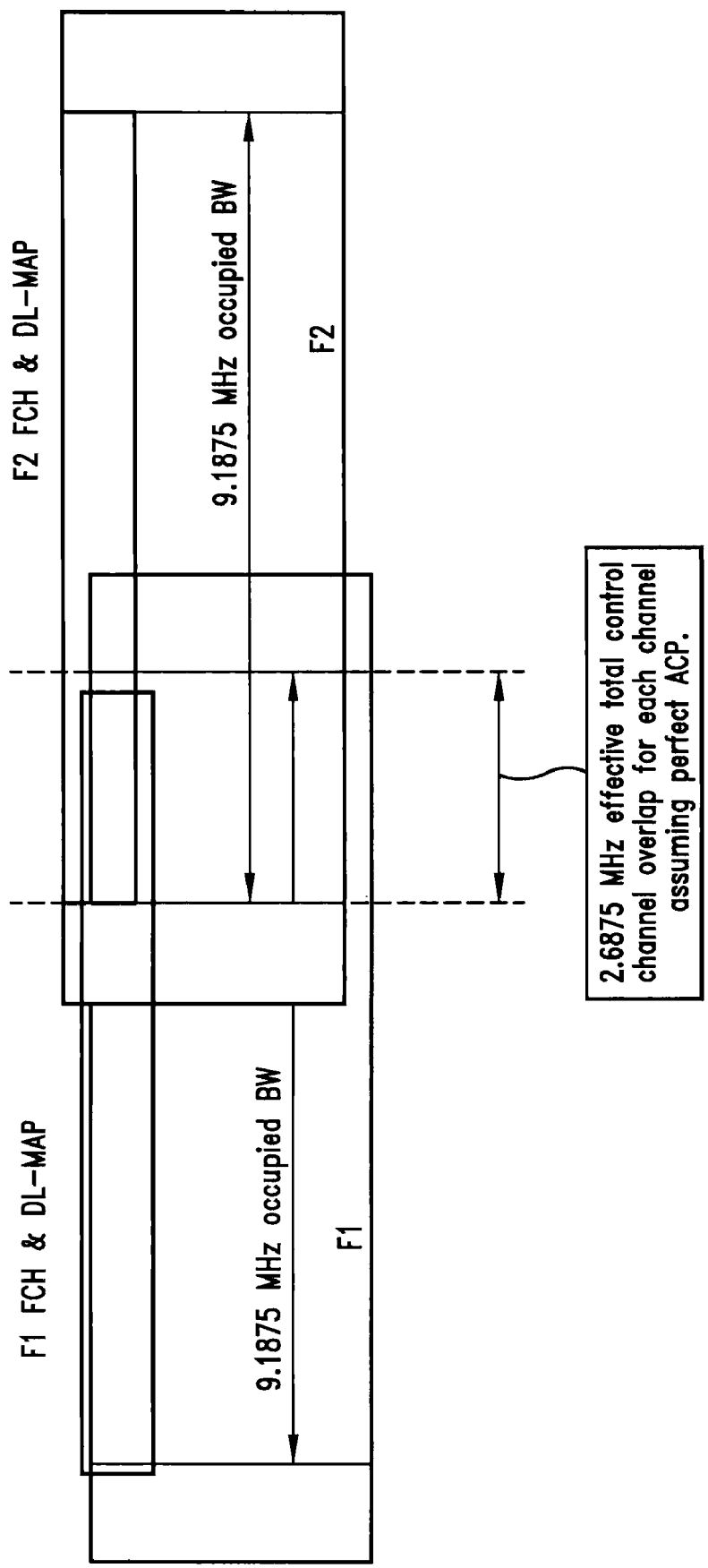
FIG. 11 illustrates FCH and DL-MAP in condensed re-use.

How is the critical issue of FCH and DL-MAP performance potentially affected by the condensed frequency reuse scheme? FIG. 10 highlights the FCH and DL-MAP, depicting the location of these regions in terms of subchannel (frequency) and time domains. The diagram of FIG. 11 crudely shows how the FCH and DL-MAP of both channels (i.e., F1 and F2) would overlap in the condensed frequency reuse scheme.

Because the FCH and first portions of the DL-MAP control channels occupy all subchannels on each WiMAX frame, the Interference, PUSC, and MAC scheduling benefits described above for traffic channel operation do not apply. Essentially the entire 2.6875 MHz of overlap region in the above diagram is potentially impacted for control channels.

In summary, downlink control channel interference is already the limiting design factor of WiMAX coverage. The overlapping channel scheme will increase control channel interference—essentially increasing the C/I requirement for cell design.

Figure 12:
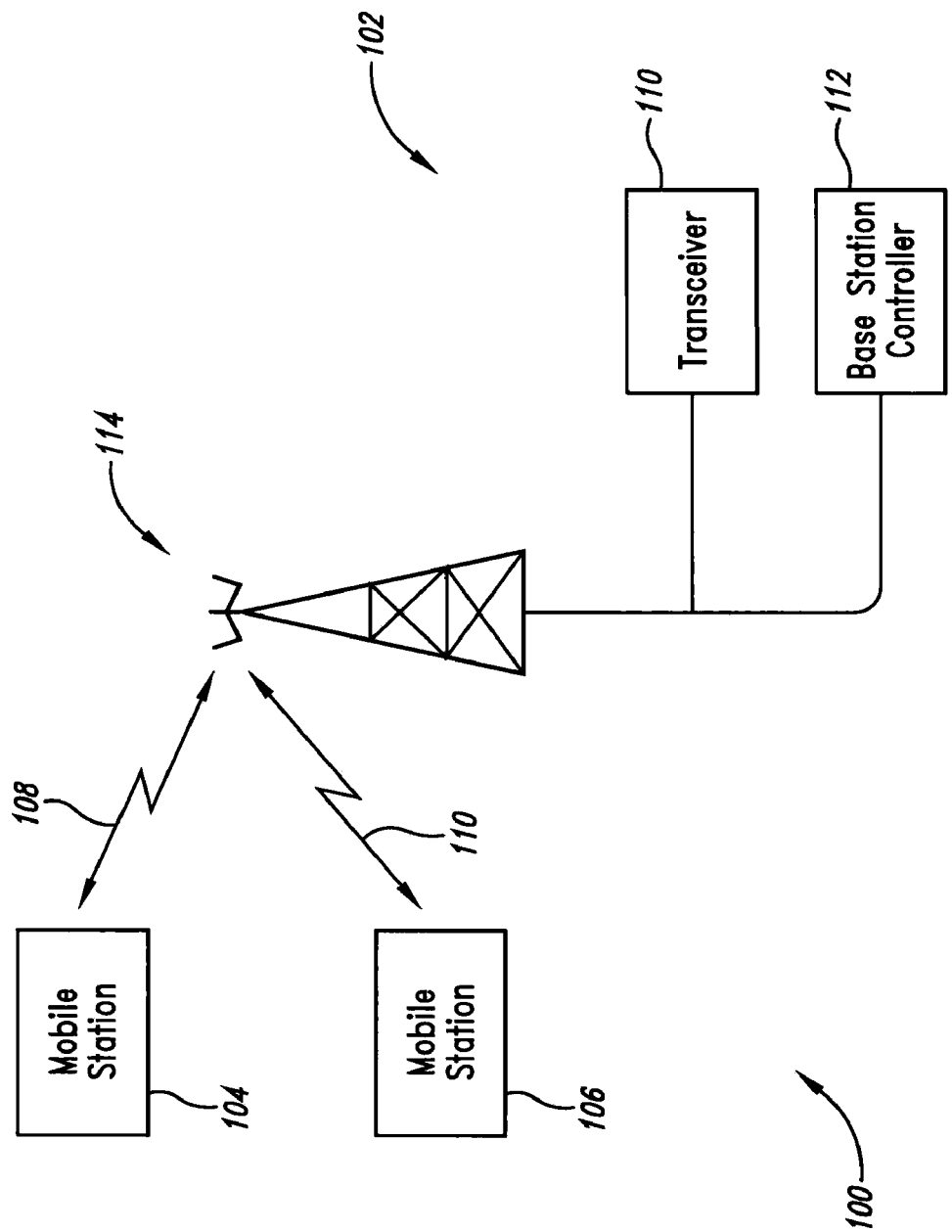
FIG. 12 is a diagram illustrating a wireless communication system constructed in accordance with the present disclosure.

FIG. 12 illustrates an embodiment of a system 100 constructed in accordance with the present disclosure. A BS 102 communicate with a MS 104 and a MS 106 over wireless communication links 108 and 110, respectively. Although referred to herein as "Mobile Stations," those skilled in the art will appreciate that a user can be in a fixed location, such as a home or office, and communicate with the BS 102 without physically changing location. The present disclosure is not limited to a MS that is actually moving.

The BS 102 comprises a transceiver 110 and a base station controller (BSC) 112. In an exemplary embodiment, the transceiver 110 is an OFDM transceiver. The transceiver 110 may be implemented as a separate transmitter and receiver. The BSC 112 controls operation of the BS 102 and, among other operations, selects the operational frequency and transmit power of the transceiver 110.

The BS 102 also has an antenna system 114. As those skilled in the art will appreciate, the BS 102 has a range of coverage that is typically divided into a plurality of sectors (e.g., three sectors). The antenna system 114 includes antenna elements that provide coverage for each of the plurality of sectors. The BS 102 may include a separate transceiver 110 for each sector. The multiple transceivers 110 may be controlled by a single BSC 112. The condensed frequency reuse implemented by the BS 102 is described above. That is, the transceivers 110 are programmed for operation using the condensed frequency reuse scheme described above. Operational details of the BS 102 is known in the art and need not be described in greater detail herein.

A cellular network typically includes a plurality of base stations constructed in accordance with the BS 102. Exemplary embodiments of cellular networks including base stations configured to implement the condensed frequency reuse scheme are provided below.

Figure 13:
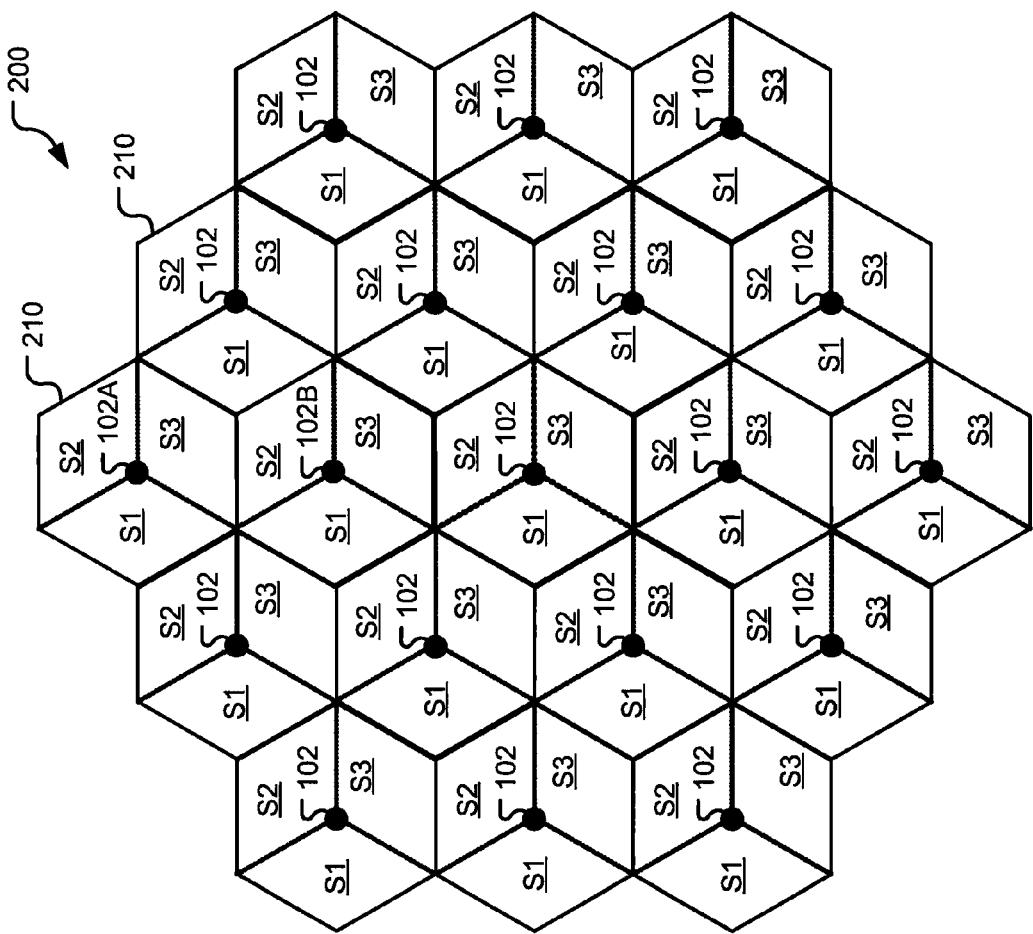
FIG. 13 is an illustration of a prior art cellular network configured to implement a conventional WiMAX 1/3/3 (i.e., 1 Base Transceiver Station ("BTS"), 3 sectors, and 3 channels) reuse plan.

Referring to FIG. 13, a prior art cellular network 200 configured to implement a conventional WiMAX 1/3/3 (i.e., 1 BTS, 3 sectors, 3 channels) reuse scheme or configuration is provided. A channel is a set of contiguous frequencies. The conventional cellular network 200 is configured for use with only non-overlapping channels. That is, there is no overlap of channels such as illustrated in FIG. 7. In other words, the channels do not have any frequencies in common. The cellular network 200 includes a plurality of cells 210 each having a BS 102 with a hexagonal range of coverage or service area 210 divided into three sectors "S1," "S2," and "S3." In each sector, the BS 102 transmits communications to the MS 104 (see FIG. 12) and receives communications from the MS 104 using a single channel. As mentioned above, the BS 102 may include a separate transceiver 110 for each sector "S1," "S2," and "S3." The transceiver 110 associated with each sector is configured to transmit and receive signals using the channel assigned to the sector.

In the prior art, all of the channels used in all of the sectors "S1," "S2," and "S3" are selected to be non-overlapping. For example, a different channel may be used in each of the sectors "S1," "S2," and "S3." All of the sectors "S1" use the same channel. All of the sectors "S2" use the same channel, which is different from the channel used by the sectors "S1." All of the sectors "S3" use the same channel, which is different from the channels used by the sectors "S1" and the sectors "S2." However, as explained above, some signal leakage may occur in the form of unintended or unavoidable interference. In particular, in conventional 1/3/3 reuse schemes, interference is typically experienced along the edges of the cells (i.e., in a portion of each sector closest to another sector in the network using the same channel). However, apart from this type of overlap, the channels selected for a conventional 1/3/3 reuse scheme are not intended to overlap and any overlap that occurs is the result of the practical realities of implementation.

In the conventional WiMAX 1/3/3 reuse scheme, a channel may have a bandwidth of 5 MHz or 10 MHz. In a 5 MHz configuration, each sector "S1," "S2," and "S3" uses a 5 MHz channel and in a 10 MHz configuration, each sector uses a 10 MHz channel. Because the sectors of adjacent base stations (e.g., the BS 102A and the BS 102B) border one another, to reduce interference, adjacent sectors are configured to use different 5 MHz or 10 MHz channels.

Capacity of the prior art cellular network 200 can be increased by extending the 1/3/3 reuse scheme to a 1/3/6 reuse scheme (i.e., 1 BTS, 3 sectors, 6 channels). In such a configuration, up to two channels may be used in each sector. This may be accomplished by configuring the BS 102 to have more than one transceiver per sector. In such configurations, all six channels used are non-overlapping. Alternatively, the capacity of the network 200 may be increased by overlaying it with a second network substantially similar to the network 200. Such a system is referred to as a stacked site/sector configuration (i.e., two overlaid 5 MHz or 10 MHz systems each implementing a 1/3/3 reuse scheme). However, like in the 1/3/6 reuse scheme, all of the channels used in both networks are non-overlapping. In both of these configurations, if the six 5 MHz channels are formed from six 5.5 MHz channels (e.g., six channels within the ITFS/MDS (EBS/BRS) 2.5 GHz band), each block has 1.5 MHz of unused bandwidth, wasting a total of 3 MHz of bandwidth.

For illustrative purposes, in the following descriptions of exemplary systems, methods, and cellular networks configured for use with overlapping channels, unless otherwise indicated, it is assumed channels "A1" and "A2" have overlapping portions and channels "C1" and "C2" have overlapping portions. By way of a non-limiting example, channels "A1" and "A2" are each 10 MHz channels sharing a first 16.5 MHz block in accordance with the condensed frequency reuse scheme described above and channels "C1" and "C2" are also each 10 MHz channels sharing a second 16.5 MHz block in accordance with the condensed frequency reuse scheme described above. The first and second 16.5 MHz blocks may be non-adjacent. However, this is not a requirement. If channels "A1" and "A2" are used in the same sector (e.g., sector S1), their overlapping portions could interfere with one another. Similarly, if channels "C1" and "C2" are used in the same sector (e.g., sector S2), their overlapping portions could interfere with one another.

Exemplary Embodiment

Figure 14:
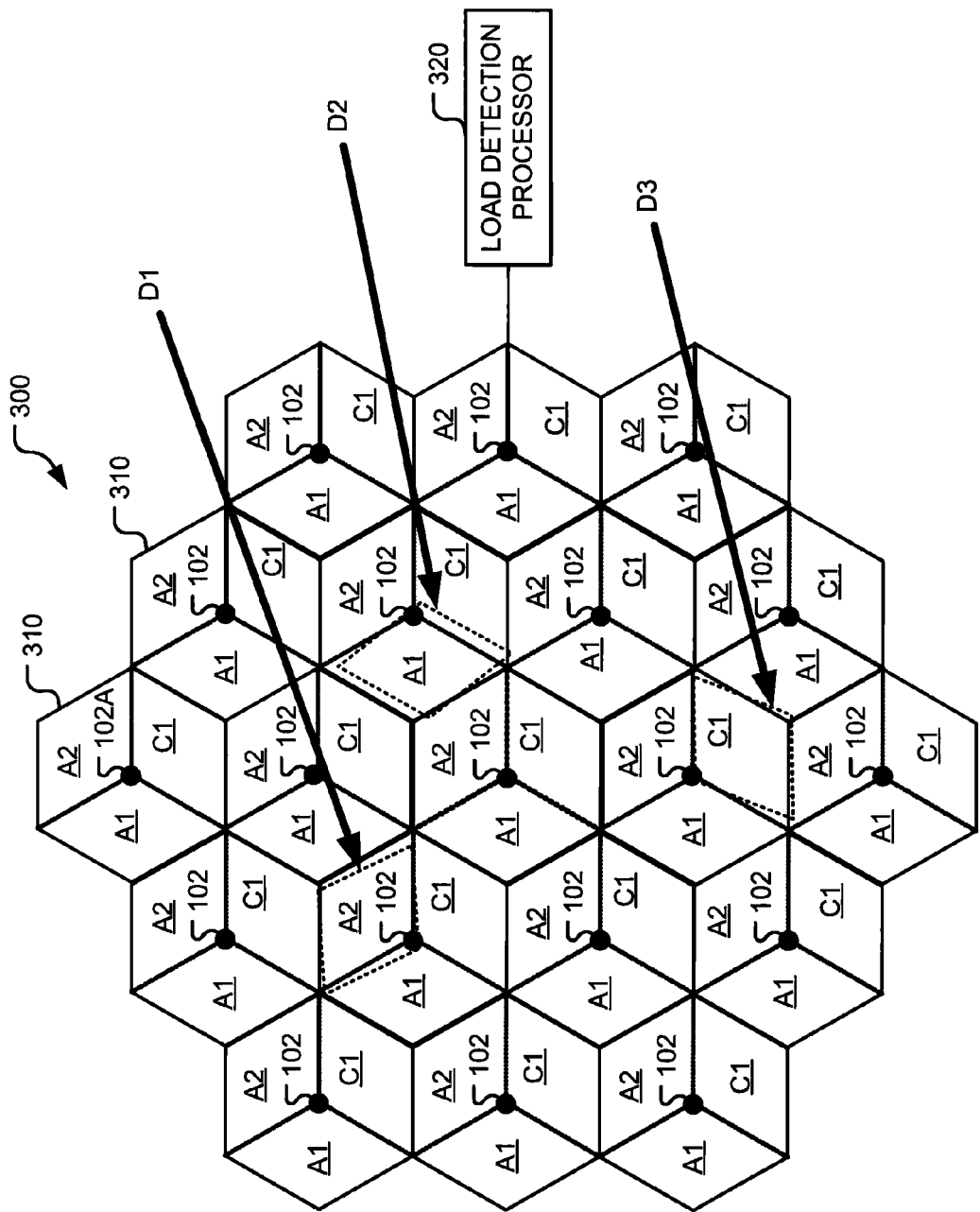
FIG. 14 is an illustration of an exemplary embodiment of a cellular network implementing a 1/3/3 reuse plan configured to deploy a fourth channel in one or more sectors as a stacked channel on an as-needed basis to address capacity hotspots in the cellular network.

Referring to FIG. 14, an exemplary embodiment of a cellular network 300 is provided. This embodiment is based on the conventional WiMAX 1/3/3 reuse configuration described above and illustrated in FIG. 13. The cellular network 300 includes a plurality of sites or cells 310. Each cell is generally hexagonally shaped with a BS 102 located near its center. The cell 310 is divided into a plurality of sectors. In FIG. 14, each of the sectors of each of the cells 310 is identified by the channel "A1," "A2," and "C1" used in the sector. As described above, the BS 102 provides communication services to the three sectors "A1," "A2," and "C1." For illustrative purposes, the cellular network 300 is configured to use only channels "A1," "A2," "C1," and "C2." However, this is not a requirement, and embodiments in which the cellular network 300 is configured to use one pair of overlapping channels and two non-overlapping channels are within the scope of the present disclosure. Further, as is apparent to those of ordinary skill in the art and in accordance with the teachings presented herein, the capacity of the cellular network 300 may be increased by stacking addition overlapping or non-overlapping channels in one or more sectors of the cells 310 and such embodiments are within the scope of the invention. Additionally, embodiments in which one or more networks are overlaid with the cellular network 300 are also within the scope of the invention.

In FIG. 14, each of the cells 310 of the cellular network 300 is configured to have only two sectors "A1" and "A2" that use overlapping channels. In the embodiment depicted, the overlapping channels are channels "A1" and "A2." The third sector "C1" is configured to use either the channel "C1" or "C2" that does not overlap the channels "A1" or "A2." For illustrative purposes, it is assumed that the third sector uses the channel "C1."

The fourth channel "C2" may be deployed within one or more sectors as a stacked channel used on an as-needed basis to address capacity hotspots in the cellular network 300. In the example of FIG. 14, diamonds "D1," "D2," and "D3" indicate regions in which the channel "C2" is in use within the cellular network 300. In regions using channel "C2," use of the channel "C2" may overlap with use of the channel "C1."

For example, the regions identified by diamonds "D1" and "D2" overlap or are stacked on sectors that use the channels "A2" and "A1," respectively. Each of the sectors using the channels "A2" and "A1" borders at least one sector using the channel "C1." Thus, channel overlap (and therefore interference caused by the overlap) may be experienced along the edges of the sectors using the channel "C2" (and one of the channels "A2" and "A1") that border a sector using the channel "C1." As illustrated in FIG. 14, this overlap may occur within a single cell as well as between different cells. This overlap may also be experienced along the edges of a sector using the channel "C1" that borders a region (e.g., the regions identified by diamonds "D1" and "D2") using the channel "C2."

The most potential for interference from bandwidth overlap occurs when use of the channel "C2" is stacked on top of (i.e., used within the same sector as) the channel "C1." This situation occurs in the region identified by the diamond "D3." In such cases, channel overlap (and therefore interference caused by the overlap) may be experienced anywhere inside the sector.

In an alternate embodiment, the channels labeled "A1" and "A2" are non-overlapping and only the channels "C1" and "C2" have overlapping portions. In such an embodiment, the channels "A1," "A2," and "C1" used in the sectors do not overlap. However, when the channel "C2" is deployed within one or more sectors (e.g., the diamond "D3" in FIG. 14) as a stacked channel used on an as-needed basis to address capacity hotspots in the cellular network 300, usage of the channel "C2" overlaps with usage of the channel "C1."

The cellular network 300 includes at least one load detection processor 320 configured to detect capacity hotspots in the cellular network 300. The load detection processor 320 may detect capacity hotspots using any method known in the art. By way of a non-limiting example, the load detection processor 320 may determine that an amount or level of communication services provided by a particular BS 102 in one or more sectors exceeds a threshold value. In response to detecting the amount of communication services provided in one or more sectors exceeds the threshold value, the load detection processor 320 may direct the particular BS 102 to also provide communication services within the one or more sectors using, by way of example, the channel "C2."

A separate load detection processor 320 may be implemented in each of the base station controllers (BSC) 112 (see FIG. 12) in the cellular network 300. Alternatively, a separate load detection processor 320 may be implemented in each of the BS 102 in the cellular network 300. By way of another example, the load detection processor 320 may be implemented in another entity of the cellular network 300. Further, the load detection processor 320 may be implemented in a dedicated computing device coupled to at least a portion of the BS 102 of the cellular network 300.

Exemplary Embodiment

Figure 15:
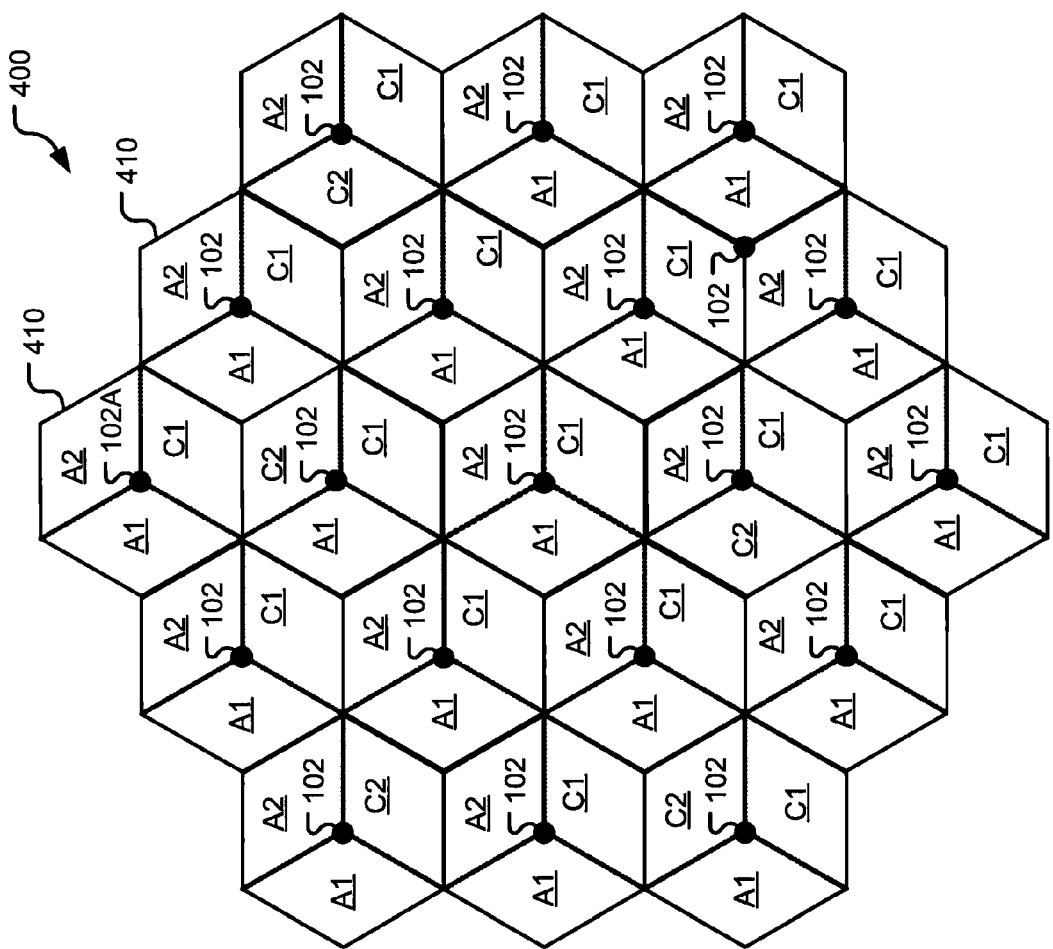
FIG. 15 is an illustration of an exemplary embodiment of a cellular network implementing a 1/3/4 reuse plan.

FIG. 15 illustrates an exemplary embodiment of a cellular network 400 configured for a 1/3/4 configuration (i.e., 1 BTS, 3 sectors, and 4 channels). For illustrative purposes, it is assumed the four channels used are channels "A1," "A2," "C1," and "C2." However, this is not a requirement, and embodiments in which the cellular network 400 is configured to use one pair of overlapping channels and two non-overlapping channels are within the scope of the present disclosure. For example, the cellular network 400 may be configured to use the overlapping channels "A1" and "A2" and two channels (e.g., channels "B1" and "B2") that do not overlap each other or channels "A1" and "A2." Further, as is apparent to those of ordinary skill in the art and in accordance with the teachings presented herein, the capacity of the cellular network 400 may be increased by stacking addition overlapping or non-overlapping channels in one or more sectors of the cells 410 and such embodiments are within the scope of the invention. Additionally, embodiments in which one or more networks are overlaid with the cellular network 400 are also within the scope of the invention.

Like the cellular network 300 described above, the cellular network 400 includes a plurality of hexagonally shaped cells 410 each including three sectors. For ease of illustration, in FIG. 15, each of the sectors of each of the cells 410 is identified by the channel "A1," "A2," "C1," and "C2" used in the sector. In the cellular network 400, the four channels "A1," "A2," "C1," and "C2" are available for use by all of cells 410 from the beginning. Unlike the cellular network 300 where the fourth channel "C2" is used on an as need basis, in the cellular network 400, the fourth channel "C2" is incorporated into the overall frequency plan, which may be optimized for the local RF environment.

In the cellular network 400 depicted in FIG. 15, each cell 410 has two sectors using overlapping channels at one time. For example, the sectors of a cell may use channels "A1" and "A2" or channels "C1" and "C2," but never all four channels. In other words, one of the pairs of overlapping channels "A1" and "A2" or "C1" and "C2" is always in use at each cell. Compared to the cellular network 300 that uses the 1/3/3 configuration, the 1/3/4 configuration of the cellular network 400 always uses of the fourth channel "C2" without requiring the inclusion of additional sectors or stacking channel use within a sector. The cellular network 400 has the potential to offer less co-channel interference, increase the overall signal-to-noise ratio, and modulation and coding scheme ("MCS") distributions in the overall network 400, and provide more capacity under load.

Exemplary Embodiment

Figure 16:
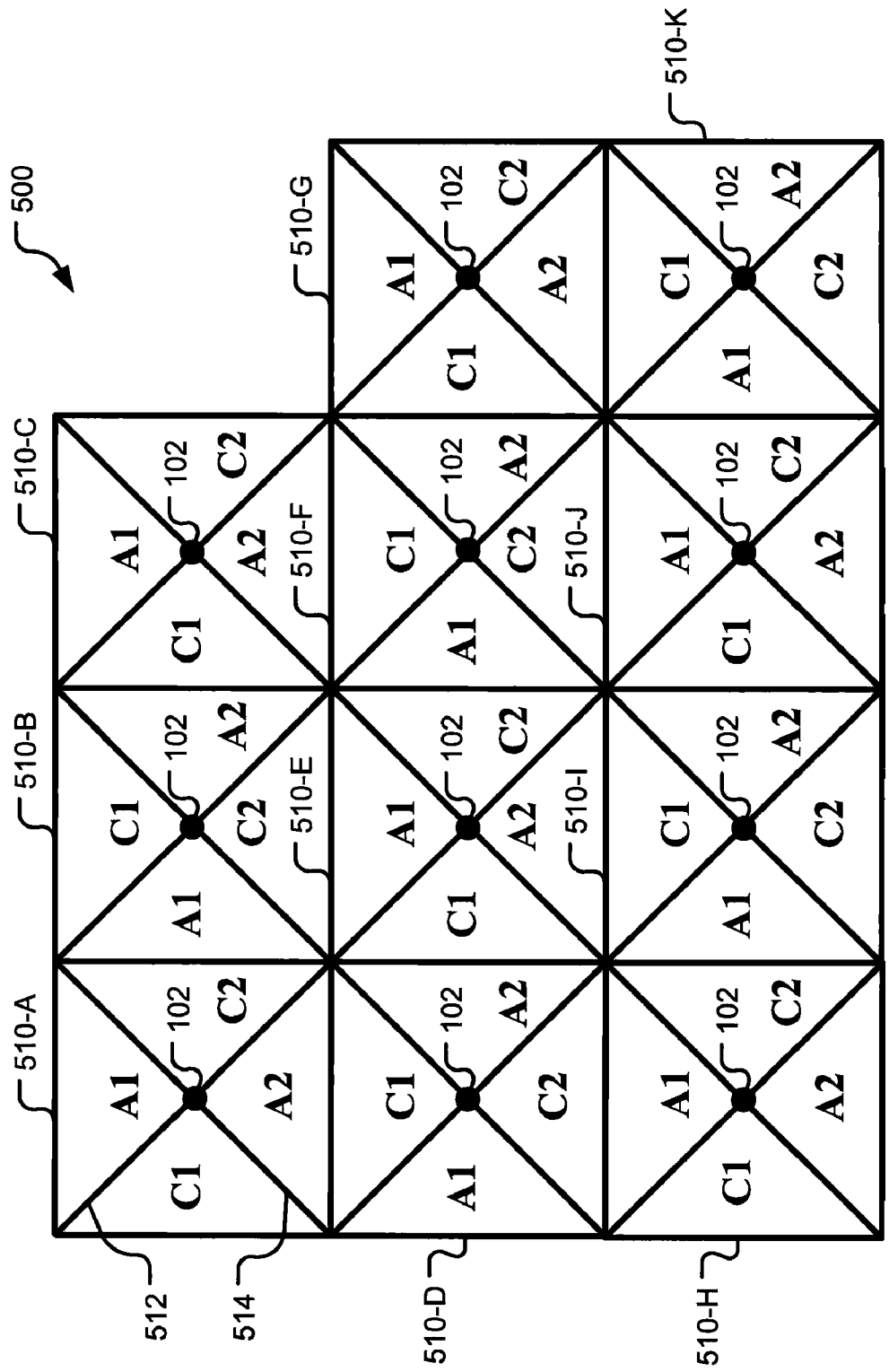
FIG. 16 is an illustration of an exemplary embodiment of a cellular network implementing a 1/4/4 reuse plan.

FIG. 16 illustrates an exemplary embodiment of a cellular network 500 configured to implement a 1/4/4 reuse plan (i.e., 1 BTS, 4 sectors, and 4 channels), referred to herein as a "Condensed Quad-sector Rotational Reuse" (CQRR) plan. The cellular network 500 includes a plurality of substantially square shaped cells 510 each divided into four substantially triangle shaped sectors. In FIG. 16, each of the four sectors is labeled with the channel used in the sector. For example, the cell 510-A has four sectors, which are labeled with channels "A1," "A2," "C1," and "C2." Each cell 510 uses all four channels "A1," "A2," "C1," and "C2." In other words, all cells 510 use both pairs of overlapping channels "A1," "A2," "C1," and "C2." However, this is not a requirement, and embodiments in which the cellular network 500 is configured to use one pair of overlapping channels and two non-overlapping channels are within the scope of the present disclosure. For example, the cellular network 400 may be configured to use the overlapping channels "A1" and "A2" and two channels (e.g., channels "B1" and "B2") that do not overlap each other or channels "A1" and "A2." Further, as is apparent to those of ordinary skill in the art and in accordance with the teachings presented herein, the capacity of the cellular network 500 may be increased by stacking addition overlapping or non-overlapping channels in one or more sectors of the cells 510 and such embodiments are within the scope of the invention. Additionally, embodiments in which one or more networks are overlaid with the cellular network 500 are also within the scope of the invention.

In the cellular network 500, the BS 102 within each cell 510 has a transceiver configured to provide communication services using a narrower horizontal beam-width antenna patterns (e.g. 60°) than those used in conventional cellular networks, such as the prior art cellular network 200 illustrated in FIG. 13. For example, the horizontal beam width of the antenna radiation pattern, and the azimuth orientation of antenna (direction in which the antenna is pointed) may be configured to produce a pie-shaped horizontal beam-width antenna pattern. By way of a non-limiting example, the transceiver(s) of the BS 102 within each cell 510 may use the pie-shaped horizontal beam-width antenna pattern. The size of the pie-shaped pattern may be determined by an angle defined between its linear sides. The angle may range from approximately 50° to approximately 70°. In some embodiments, the angle may be approximately 60°. In further embodiments, the angle may range from approximately 80° to approximately 110°. In some embodiments, the angle may be approximately 90°. These patterns may provide increased antenna directivity and front-to-back ratios that may be used to create a "bow-tie" affect. While a "bow-tie" pattern usually refers to a single radiation pattern of a particular antenna. In FIG. 16, the "bow-tie" pattern is created by the radiation patterns of two separate antennas, which when oriented as described, create a bow-tie affect on the frequency planning.

Figure 17:
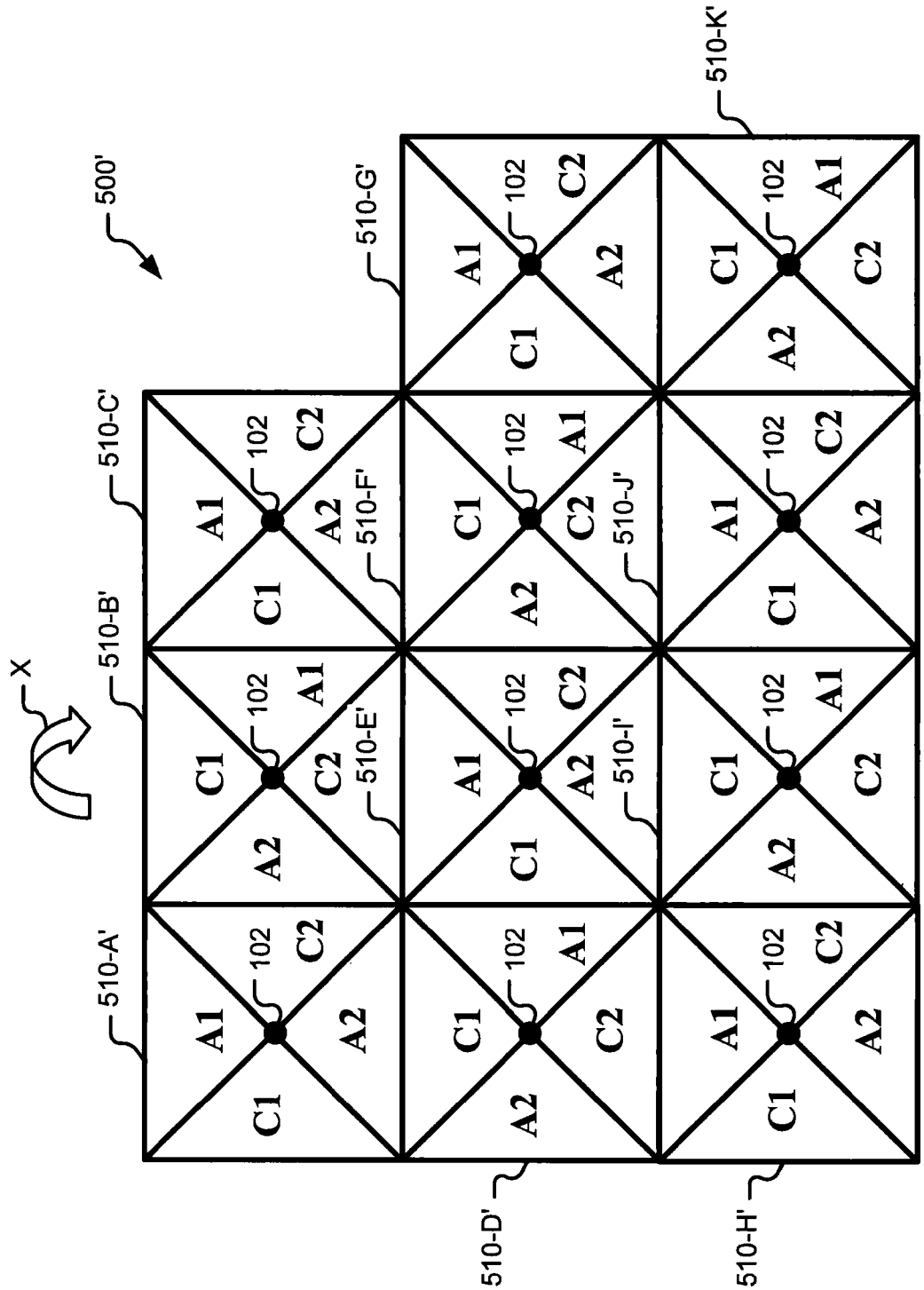
FIG. 17 is an alternate embodiment of the cellular network of FIG. 16.

FIG. 17 depicts a cellular network 500' that is substantially similar to the network 500. The cellular network 500' differs from the cellular network 500 only with respect to the channels used in each of the sectors of the cells 510'. In other words, the frequency plan or cell layout of the cellular network 500' differs from that of the cellular network 500. The layout of the cells 510' within the network 500' may be determined by selecting a first cell (e.g., the cell 510-A') and assigning a channel to each sector of the cell. The layout of each cell adjacent to the first cell is determined by rotating the first square shaped cell 90° in a selected direction of rotation (e.g., the direction identified by curved arrow "X"). These cells are referred to as "rotated cells." For the purposes of creating the cell layout, only cells falling along one of the edges of the first cell are considered adjacent. Therefore, cells 510-B' and cell 510-D' are adjacent to the cell 510-A'. Cells located at the corners of the first cell are not considered to be adjacent to the first cell. Therefore, cell 510-E' is not considered to be adjacent to the cell 510-A'. Thus, at this point in the process, the layout of the first cell 510-A' and the cells 510-B' and cell 510-D' adjacent to the first cell 510-A' have been determined.

To layout additional cells of the network 500', one of the rotated cells is selected (e.g., the rotated cell 510-B'). The layout of any cell adjacent to the selected rotated cell is identical to that of the first cell 510-A'. In this manner, the layout of the cellular network 500' includes an alternating pattern of cell layouts (i.e., the layout of the cells alternates between the layout of the first cell 510-A' and the layout of the rotated cells). Such a configuration is potentially optimal for the condensed four-channel frequency plan.

Returning to FIG. 16, as is apparent to those of ordinary skill, the layout of the cellular network 500 differs from the layout of the cellular network 500' only with respect to how the first cell (e.g., the cell 510-A) is rotated to create the layout of the rotated cells (e.g., the cells 510-B and 510-D). In this embodiment, the layout of the rotated cells (i.e., the cells adjacent to the first cell) is determined by rotating the first square shaped cell 1800 about one of the diagonals 512 or 514 in a selected direction of rotation. Alternatively, the layout of the rotated cells may also be created by rotating one pair of opposing sectors (e.g., the sectors using channels "C1" and "C2") of the first square shaped cell 900 in a first direction and rotating the other pair of opposing sectors (e.g., the sectors using channels "A1" and "A2") of the first square shaped cell 900 in a direction opposite the first direction. Such a configuration is potentially optimal for the condensed four-channel frequency plan.

The square shaped four sector cells 510 used in the cellular network 500 may offer advantage over the clover-leaf design of traditional three-sector hexagon cells (see FIG. 13), in the context of an overlapping 1/4/4 reuse system. For example, the network geometry of the cellular network 500 may minimize intra-site interference caused by the overlapping channels "A1," "A2," "C1," and "C2." The network geometry of the cellular network 500 may also minimize increased adjacent channel exposure within a cell. Further, the network geometry of the cellular network 500 may minimize inter-site co-channel interference (i.e., crosstalk from two different radio transmitters reusing the same frequency channel or overlapping channel frequencies).

While the cellular networks 300, 400, 500, and 500' have been described as configured to implement the condensed frequency reuse scheme described above, through application of ordinary skill in the art to the present teachings, the networks may be configured for use with alternate overlapping and non-overlapping channels.

PRO/CON Summary

The condensed reuse configuration offers potentially significant benefits to a service provider. Below is a summary of the pros and potential cons, as currently understood.

Pros:
  Enables efficient deployment of 10 MHz channels using non-contiguous blocks of EBS/BRS spectrum based on a minimum of 33 MHz (six ITFS channels).
  Maximizes full usage of operator spectrum.
  Potentially provides a minimum of ~23% spectral efficiency improvements over default WiMAX re-use schemes in markets with non-contiguous blocks of EBS/BRS spectrum (i.e. an A and C block).
  For markets with contiguous but limited amounts of EBS/BRS spectrum (i.e. an A and B block), allows operator to run 10 MHz channels with similar and possibly better spectral efficiency than 5 MHz channels, while achieving better peak throughputs.
  For mature markets, a 1/4/4 10 MHz system may provide similar or better performance than two overlaid 1/3/3 5 MHz systems, while enjoying the benefits of 10 MHz channels (higher peak data rates per user, single bandwidth devices, etc)—at much lower cost. Each site would have 4 sectors instead of 6, or 33% less sectors in the network.
  Enables a range of scalable reuse deployment options:
  a) Flexibility to address capacity requirements in a 1/3/3 system by stacking the $4^{th}$ channel on an as-needed basis at hotspot sectors.
  b) Improved SINR gains by running adding a $4^{th}$ channel to the frequency plan in a network, creating a 1/3/4 system
  The combination of all above features would potentially provide a single, scalable solution for a service provider to deploy 10 MHz channels in all markets. Specifically, it would permit the operation of 10 MHz channels with a minimum cellular reuse 3, regardless of the amount or structure of available spectrum—the minimum requirement for operation is two non-adjacent EBR/BRS blocks. This would potentially eliminate the need for 5 MHz operation, and reduce any dependency on the dubious performance of WiMAX reuse 1.

Cons
  Potential adjacent channel performance issues.
  DL-MAP interference increase due to frequency overlap may mitigate overall cost effectiveness of the solution in terms of cell radius.
  Potential roaming complications. The condensed frequency reuse scheme would make use of center frequencies that may be different among roaming partner companies. Currently, WiMAX standards do not specify roaming channel mechanisms. At some point a concept of shared channel configurations must be introduced, at which point presumably operators will develop a mechanism to synchronize mutual channel assignments, and this issue would be resolved. Previous cellular technologies have all dealt with these issues successfully exchanging information on their respective frequency plans.
  Inter-band and intra-band roaming specifications are currently under development in the WiMAX Forum GRWG (Global Roaming Working Group). Theoretically, if the condensed frequency reuse scheme is beneficial to one party it would offer just as much benefit for the roaming partner deploying within the same band. In fact, this could potentially even stimulate frequency "horse-trading" to maximize efficient deployments for both companies.

The foregoing described embodiments depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Accordingly, the invention is not limited except as by the appended claims.

The invention claimed is:

1. A cellular network comprising: a plurality of mobile stations; and a plurality of cells each comprising a base station configured to provide communication services to ones of the plurality of mobile stations over four channels within a service area divided into three sectors, the four channels comprising a first pair of channels and a second pair of channels, each of the four channels comprising a band of contiguous frequencies, wherein the band of contiguous frequencies of the first pair of channels do not have overlapping portions,
the band of contiguous frequencies of the second pair of channels have overlapping portions,
the base station is configured to provide communication services within a first of the three sectors using one of the channels of the first pair of channels,
the base station is further configured to provide communication services within a second of the three sectors using the other of the channels of the first pair of channels,
the base station is further configured to provide communication services within a third of the three sectors using one of the channels of second pair of channels, and
the base station is further configured to provide communication services within at least one of the first, second, and third of the three sectors using the other of the channels of second pair of channels.

2. The cellular network of claim 1, further comprising: a load detection processor configured to detect that an amount of communication services provided by the base stations of the plurality of cells in one or more of the three sectors exceeds a threshold value, and in response to detecting the amount of communication services provided in one or more of the three sectors exceeds the threshold value, provide communication services within the at least one of the first, second, and third of the three sectors using the other of the channels of second pair of channels.

3. A cellular network comprising,
a plurality of mobile stations;
and a plurality of cells each comprising a base station configured to provide communication services to ones of the plurality of mobile stations over four channels within a service area divided into four sectors, the four channels comprising a first pair of channels and a second pair of channels, each of the four channels comprising a band of contiguous frequencies,
wherein the band of contiguous frequencies of both the first and second pairs of channels have overlapping portions,
the base station is configured to provide communication services within each of the four sectors using a different one of the four channels,
each of one or more sectors of a portion of the plurality of cells is located adjacent to a different sector of a different cell of the plurality of cells,
and the base stations of the portion of the plurality of cells are configured to use a channel of the four channels in each of the one or more sectors that is different from the channel used in the adjacent different sector of the different cell.

4. The cellular network of claim 3, wherein the service area of each of the cells is substantially square shaped, and each of the sectors is substantially triangle shaped.

5. The cellular network of claim 3, wherein for each of the one or more of the four sectors of the portion of the plurality of cells, the band of contiguous frequencies of the channel used in the sector does not overlap the band of contiguous frequencies of the channel used in the adjacent different sector of the different cell.

6. The cellular network of claim 3, wherein each of the base stations of the plurality of cells comprises an OFDM transceiver for each of the four sector of the service area, and each transceiver is configured to use one of the four channels to communicate with ones of the plurality of remote units located within the sector.

7. The cellular network of claim 3, wherein the four channels each comprise a portion of an Educational Broadband Service (EBS)/Broadcast Radio Services (BRS) band, the first pair of channels are adjacent channels in the EBS/BRS band, the second pair of channels are adjacent channels in the EBS/BRS band, and the first pair of channels are adjacent to the second pair of channels in the EBS/BRS band.

8. The cellular network of claim 3, wherein the four channels each comprise a portion of an Educational Broadband Service (EBS)/Broadcast Radio Services (BRS) band, the first pair of channels are adjacent channels in the EBS/BRS band, the second pair of channels are adjacent channels in the EBS/BRS band, and the first pair of channels are not adjacent to the second pair of channels in the EBS/BRS band.

9. The cellular network of claim 3, wherein each of the four channels includes an occupied portion used for data communication flanked by a pair of unused guard bands,
the overlapping portion of each of the first and second pairs of channels includes one of the pair of unused guard bands of each of the channels of the pair of channels.

10. The cellular network of claim 9, wherein the band of contiguous frequencies of each of the four channels has a bandwidth of 10 MHz comprising 1024 subcarriers, each of the pair of unused guard bands comprising 94 subcarriers and the occupied portion comprising 840 subcarriers.

11. The cellular network of claim 9, wherein the band of contiguous frequencies of each of the four channels has a bandwidth of 5 MHz comprising 512 subcarriers, each of the pair of unused guard bands comprising 46 subcarriers and the occupied portion comprising 466 subcarriers.

12. A cellular network to provide communication services to a plurality of mobile stations over four channels, the four channels comprising a first pair of channels and a second pair of channels, each of the first and second pairs of channels having an overlapping portion, the cellular network comprising:

a plurality of substantially square shaped cells each comprising four sectors and a base station configured to provide communication services to ones of the plurality of mobile stations located within the four sectors, the base station being configured to use a different one of four channels within each of the four sectors, the sectors in which the channels of the first pair of the channels are used being nonadjacent to one another, wherein each of one or more of the four sectors of a portion of the plurality of cells is located adjacent to a different sector of a different cell of the plurality of cells, and the base stations of the portion of the plurality of cells are configured to use channels of the four channels in each of the one or more sectors that is different from the channel used in the adjacent different sector of the different cell.

13. The cellular network of claim 12, wherein each of the base stations of the plurality of cells comprises an orthogonal frequency division multiplexing (OFDM) transceiver for each sector of the service area, and each transceiver is configured to use one of the four channels to communicate with the ones of the plurality of remote units located within the sector.

14. The cellular network of claim 13, wherein the OFDM transceiver is configured to provide communication services using a horizontal beam-width antenna pattern having an angle ranging from approximately 50° to approximately 70°.

15. The cellular network of claim 13, wherein the OFDM transceiver is configured to provide communication services using a horizontal beam-width antenna pattern having an angle ranging from approximately 80° to approximately 110°.

16. A method comprising: for use with a single cell within a cellular network, the cell comprising a base station configured to provide communication services to mobile stations within a service area divided into three sectors, the method comprising:

selecting a pair of overlapping channels;
selecting a pair of channels;
configuring the base station to provide communication services within a first sector of the three sectors using a first one of the channels of the pair of non-overlapping channels,
configuring the base station to provide communication services within a second sector of the three sectors using a second one of the channels of the pair of non-overlapping channels; and
configuring the base station to provide communication services within a third sector of the three sectors using a first one of the channels of the pair of overlapping channels, and
configuring the base station to provide communication services within at least one of the first sector, the second sector, and the third sector using a second one of the channels of the pair of overlapping channels.

17. The method of claim 16, wherein selecting the pair of overlapping channels comprises:

allocating a pair of channels within a first portion of an Educational Broadband Service/Broadcast Radio Services band having a predetermined bandwidth, each of the pair of channels having an identical allocated bandwidth, the total bandwidth of the allocated channels exceeding the predetermined bandwidth.

18. The method of claim 17, wherein selecting the pair of non-overlapping channels comprises:

allocating a pair of channels within a second portion of an Educational Broadband Service/Broadcast Radio Services band.

19. The method of claim 18, wherein the first portion of the Educational Broadband Service/Broadcast Radio Services band is adjacent the second portion of the Educational Broadband Service/Broadcast Radio Services band.

20. A method of determining a layout for a plurality of cells of a cellular network, each of the plurality of cells being generally square shaped and divided along its diagonals into four sectors comprising two pairs of opposing sectors, each of the plurality of cells comprising a base station configured to provide communication services to mobile stations located within the four sectors, the method comprising:

selecting a first cell of the plurality of cells of a cellular network;
assigning a first pair of overlapping channels one each to the sectors of a first of the pairs of opposing sectors of the first cell;
assigning a second pair of overlapping channels one each to the sectors of a second of the pairs of opposing sectors of the first cell;
for each of the four sectors of the first cell, configuring the base station of the first cell to use the channels assigned to the sector to provide communication services to ones of the mobile stations located within the sector,
selecting a second cell adjacent to the first cell;
assigning the first pair of overlapping channels one each to the second of the pairs of opposing sectors of the second cell; and
assigning the second pair of overlapping channels one each to the sectors of the first of the pairs of opposing sectors of the second cell, and
for each of the four sectors of the second cell, configuring the base station of the second cell to use the channels assigned to the sector to provide communication services to ones of the mobile stations located within the sector.

21. The method of claim 20, wherein a first cell layout is defined by the assignment of the first pair of overlapping channels to the first of the pairs of opposing sectors of the first cell and the assignment of the second pair of overlapping channels to the second of the pairs of opposing sectors of the first cell, the method further comprising:

defining a rotated cell layout by rotating the first cell layout,
wherein the assigning of the first pair of overlapping channels one each to the second of the pairs of opposing sectors of the second cell comprises assigning the first pair of overlapping channels to the same sectors in which they are assigned in the rotated cell layout, and
wherein the assigning of the second pair of overlapping channels one each to the first of the pairs of opposing sectors of the second cell comprises assigning the second pair of overlapping channels to the same sectors in which they are assigned in the rotated cell layout.

22. The method of claim 21, wherein rotating the first cell layout comprises rotating the first cell ninety degrees.

23. The method of claim 21, wherein rotating the first cell layout comprises rotating the first cell one hundred and eighty degrees about one of its diagonals.

24. A cellular network comprising:
a plurality of substantially square cells each divided along its diagonals into four sectors comprising two pairs of opposing sectors, each of the plurality of cells comprising a base station configured to provide communication services to mobile stations within the four sectors;
a cell plan having an alternating pattern in which a first cell layout is flanked on all four of its sides, but not along its diagonal, by a rotated cell layout and the rotated cell layout is flanked on all four of its sides, but not along its diagonal, by the first cell layout, the first cell layout having one of four channels assigned to each of its four sectors, each of the four channels comprising a band of contiguous frequencies, a first pair of the four channels having overlapping portions, a second pair of the four channels having overlapping portions, the first pair of channels having being assigned to a first of the pairs of opposing sectors, the second pair of channels being assigned to a second of the pairs of opposing sectors.

25. The cellular network of claim 24, wherein the rotated cell layout is identical to the first cell layout rotated ninety degrees.

26. The cellular network of claim 24, wherein the rotated cell layout is identical to the first cell layout rotated one hundred and eighty degrees about one of its diagonals.

27. The cellular network of claim 1, wherein the four channels each comprise a portion of an Educational Broadband Service (EBS)/Broadcast Radio Services (BRS) band, the first pair of channels are adjacent channels in the EBS/BRS band,
the second pair of channels are adjacent channels in the EBS/BRS band, and
the first pair of channels are adjacent to the second pair of channels in the EBS/BRS band.

28. The cellular network of claim 1, wherein the four channels each comprise a portion of an Educational Broadband Service (EBS)/Broadcast Radio Services (BRS) band,
the first pair of channels are adjacent channels in the EBS/BRS band,
the second pair of channels are adjacent channels in the EBS/BRS band, and
the first pair of channels are not adjacent to the second pair of channels in the EBS/BRS band.

29. The cellular network of claim 1, wherein each of the four channels includes an occupied portion used for data communication flanked by a pair of unused guard bands, and
the overlapping portion of the second pair of channels includes one of the pair of unused guard bands of each of the channels of the second pair of channels.

30. The cellular network of claim 29, wherein the band of contiguous frequencies of each of the four channels has a bandwidth of 10 MHz comprising 1024 subcarriers, each of the pair of unused guard bands comprising 94 subcarriers and the occupied portion comprising 840 subcarriers.

31. The cellular network of claim 29, wherein the band of contiguous frequencies of each of the four channels has a bandwidth of 5 MHz comprising 512 subcarriers, each of the pair of unused guard bands comprising 46 subcarriers and the occupied portion comprising 466 subcarriers.

* * * * *